(12) United States Patent
Nagaraja et al.

(10) Patent No.: US 11,153,820 B2
(45) Date of Patent: Oct. 19, 2021

(54) TECHNIQUES FOR INDICATING OR USING INFORMATION ABOUT A SUBSEQUENT PHYSICAL DOWNLINK CONTROL CHANNEL TRANSMISSION

(71) Applicant: Qualcomm Incorporated, San Diego, CA (US)

(72) Inventors: Sumeeth Nagaraja, Los Altos, CA (US); Tao Luo, San Diego, CA (US); Aleksandar Damnjanovic, Del Mar, CA (US); Karl Georg Hampel, Hoboken, NJ (US); Keiichi Kubota, Tokyo (JP); Andrei Radulescu, San Diego, CA (US); Haitong Sun, Cupertino, CA (US); Ozcan Ozturk, San Diego, CA (US); Peng Cheng, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/344,448

(22) PCT Filed: Jan. 3, 2018

(86) PCT No.: PCT/CN2018/070092
§ 371 (c)(1),
(2) Date: Apr. 24, 2019

(87) PCT Pub. No.: WO2018/127049
PCT Pub. Date: Jul. 12, 2018

(65) Prior Publication Data
US 2019/0349854 A1    Nov. 14, 2019

(30) Foreign Application Priority Data

Jan. 4, 2017  (WO) ................ PCT/CN2017/070145

(51) Int. Cl.
| | | |
|---|---|---|
| *H04W 52/02* | (2009.01) | |
| *H04W 72/04* | (2009.01) | |
| *H04W 74/00* | (2009.01) | |
| *H04W 72/12* | (2009.01) | |
| *H04W 74/08* | (2009.01) | |

(52) U.S. Cl.
CPC ..... *H04W 52/0216* (2013.01); *H04W 72/046* (2013.01); *H04W 72/0446* (2013.01); *H04W 72/0453* (2013.01); *H04W 74/004* (2013.01)

(58) Field of Classification Search
CPC .......... H04W 52/0216; H04W 74/004; H04W 72/046; H04W 72/0453; H04W 72/0446;
(Continued)

(56) References Cited

U.S. PATENT DOCUMENTS

| 10,735,982 B2 * | 8/2020 | Fujishiro | ............... H04W 24/08 |
| 2006/0164969 A1 * | 7/2006 | Malik | ................... H04W 16/28 |
| | | | 370/203 |

(Continued)

FOREIGN PATENT DOCUMENTS

| CN | 101931493 A | 12/2010 | |
| CN | 102036178 A | 4/2011 | |
| WO | WO-2014190897 A1 * | 12/2014 | ............ H04W 48/16 |

OTHER PUBLICATIONS

International Search Report and Written Opinion—PCT/CN2017/070145—ISA/EPO—dated Sep. 27, 2017.
(Continued)

*Primary Examiner* — Harry H Kim
(74) *Attorney, Agent, or Firm* — Holland & Hart LLP

(57) ABSTRACT

Techniques are described for wireless communication. A method for wireless communication at a user equipment (UE) includes receiving, by the UE, a first transmission on a beam over a radio frequency spectrum during a first time interval. The first transmission includes an indication of a subsequent physical downlink control channel (PDCCH)

(Continued)

transmission on the beam. The indication includes information about a PDCCH in a second time interval subsequent to the first time interval. The method also includes configuring a power saving state of the UE based at least in part on the indication. A method for wireless communication at a network access device includes transmitting the first transmission to at least one UE, and transmitting the PDCCH during the second time interval.

29 Claims, 15 Drawing Sheets

(58) Field of Classification Search
CPC ......... H04W 52/0229; H04W 74/0833; H04W 72/1289; Y02D 70/00; Y02D 70/22; Y02D 70/146; Y02D 70/142; Y02D 70/1242; Y02D 70/1262
See application file for complete search history.

(56) References Cited

U.S. PATENT DOCUMENTS

| | | | |
|---|---|---|---|
| 2010/0248750 A1* | 9/2010 | Muller | H04W 68/02 455/458 |
| 2012/0002635 A1 | 1/2012 | Chung et al. | |
| 2013/0182626 A1 | 7/2013 | Kuo | |
| 2013/0286960 A1* | 10/2013 | Li | H04W 72/042 370/329 |
| 2014/0198733 A1 | 7/2014 | Yin et al. | |
| 2015/0029910 A1* | 1/2015 | He | H04W 36/0083 370/280 |
| 2015/0245329 A1 | 8/2015 | Pan et al. | |
| 2018/0255575 A1* | 9/2018 | Yu | H04W 74/0833 |
| 2018/0270852 A1* | 9/2018 | Tabet | H04L 5/0044 |
| 2018/0302810 A1* | 10/2018 | Fujishiro | H04W 76/28 |
| 2019/0239192 A1* | 8/2019 | Tang | H04B 7/0695 |
| 2019/0261287 A1* | 8/2019 | Deenoo | H04W 24/08 |
| 2019/0261448 A1* | 8/2019 | Hu | H04W 24/10 |
| 2019/0268931 A1* | 8/2019 | He | H04B 7/2615 |
| 2019/0297609 A1* | 9/2019 | Pan | H04L 5/001 |
| 2019/0349915 A1* | 11/2019 | Ahn | H04B 7/0695 |
| 2020/0045725 A1* | 2/2020 | Mochizuki | H04W 72/046 |

OTHER PUBLICATIONS

International Search Report and Written Opinion—PCT/CN2018/070092—ISA/EPO—dated Mar. 28, 2018.
Supplementary European Search Report—EP18735976—Search Authority—The Hague—dated Jul. 30, 2020.

* cited by examiner

TECHNIQUES FOR INDICATING OR USING INFORMATION ABOUT A SUBSEQUENT PHYSICAL DOWNLINK CONTROL CHANNEL TRANSMISSION

CROSS REFERENCES

The present 371 application for patent claims priority to PCT International Patent Application No. PCT/CN2018/070092 to NAGARAJA et. al., titled "TECHNIQUES FOR INDICATING OR USING INFORMATION ABOUT A SUBSEQUENT PHYSICAL DOWNLINK CONTROL CHANNEL TRANSMISSION", filed Jan. 3, 2018, and to PCT International Patent Application No. PCT/CN2017/070145 to NAGARAJA et. al., titled "TECHNIQUES FOR INDICATING OR USING INFORMATION ABOUT A SUBSEQUENT PHYSICAL DOWNLINK CONTROL CHANNEL TRANSMISSION", filed Jan. 4, 2017, each of which is assigned to the assignee hereof.

BACKGROUND

Field of the Disclosure

The present disclosure, for example, relates to wireless communication systems, and more particularly to techniques for indicating or using information about a subsequent physical downlink control channel (PDCCH) transmission.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a 3G, 4G, Long-Term Evolution (LTE), or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). A network access device may communicate with a set of UEs on downlink channels (e.g., for transmissions from the network access device to the set of UEs) and uplink channels (e.g., for transmissions from the set of UEs to the network access device).

When a UE is not receiving or transmitting over a wireless network, the UE may activate a power saving state, in which a receiver or transmitter of the UE is turned OFF or transitioned to a lower power state (e.g., an inactive state). For a mobile UE, selective activation of a power saving tends to prolong battery life.

SUMMARY

In accordance with described techniques, a network access device may indicate information about a subsequent PDCCH transmission to one or more UEs, and a UE may configure a power saving state of the UE based at least in part on the information. For example, a network access device may transmit a first transmission on a beam over a radio frequency spectrum during a first time interval, and the first transmission may include an indication of a subsequent PDCCH transmission on the same beam. The indication of the subsequent PDCCH transmission may include information about a PDCCH in a second time interval subsequent to the first time interval and transmitted on the same beam. When the UE determines that the PDCCH in the second time interval is associated with a second transmission separate from the first transmission, or that the PDCCH in the second time interval does not schedule a transmission for the UE, or that the PDCCH in the second time interval is associated with a duplicate transmission, the UE may activate a power saving state to conserve power. In some examples, the UE may activate the power saving state after receiving the first transmission, or after receiving a physical downlink shared channel (PDSCH) that is scheduled by the first transmission. When the UE determines that the PDCCH in the second time interval is a PDCCH that schedules a transmission for the UE, or determines that the PDCCH (or a PDSCH associated with the PDCCH) contains information the UE would like to obtain, the UE may refrain from activating the power saving state, or the UE may activate and deactivate the power saving state in a manner that enables the UE to receive the PDCCH on the beam in the second time interval.

In one example, a method for wireless communication at a UE is described. The method may include receiving, by the UE, a first transmission on a beam over a radio frequency spectrum during a first time interval. The first transmission may include an indication of a subsequent PDCCH transmission on the beam. The indication may include information about a PDCCH in a second time interval subsequent to the first time interval. The method may also include configuring a power saving state of the UE based at least in part on the indication.

In some examples, the method may include determining, based at least in part on the indication of the subsequent PDCCH transmission, at least one of: that the PDCCH in the second time interval is associated with a second transmission separate from the first transmission, that the PDCCH in the second time interval does not schedule a transmission for the UE, or that the PDCCH in the second time interval is associated with a duplicate transmission. In some examples, configuring the power saving state of the UE may include activating the power saving state after receiving at least one of: the first transmission, a PDSCH that is scheduled by the first transmission, or a combination thereof; and deactivating the power saving state: after a time indicated by the indication of the subsequent PDCCH transmission, after a timing of the PDCCH and an associated PDSCH in the second time interval, or to receive the PDCCH in the second time interval. In some examples, the method may include receiving the PDCCH on the beam based at least in part on the indication of the subsequent PDCCH transmission. In some examples, the method may include determining, from the indication of the subsequent PDCCH transmission, at least one of: a timing of the PDCCH, a frequency of the PDCCH, or a combination thereof. In some examples, configuring the power saving state of the UE may include activating the power saving state after receiving at least one of: the first transmission, a PDSCH that is scheduled by the first transmission, or a combination thereof, and deactivating the power saving state to receive the PDCCH.

In some examples, the method may include receiving, on the beam, an indication of subsequent PDCCH indication enablement. The indication of subsequent PDCCH indication enablement may be received in at least one of: a master information block (MIB), a minimum system information (SI) transmission, a system information block (SIB), radio resource control (RRC) signaling, or a combination thereof. In some examples, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, or a combination thereof. In some examples, the method may include transmitting a random access preamble on the beam, and the first transmission and the PDCCH may be received on the beam in a random access response (RAR) window, based at least in part on the transmission of the random access preamble.

In one example, an apparatus for wireless communication at a UE is described. The apparatus may include means for receiving, by the UE, a first transmission on a beam over a radio frequency spectrum during a first time interval. The first transmission may include an indication of a subsequent PDCCH transmission on the beam. The indication may include information about a PDCCH in a second time interval subsequent to the first time interval. The apparatus may also include means for configuring a power saving state of the UE based at least in part on the indication.

In some examples, the apparatus may include means for determining, based at least in part on the indication of the subsequent PDCCH transmission, at least one of: that the PDCCH in the second time interval is associated with a second transmission separate from the first transmission, that the PDCCH in the second time interval does not schedule a transmission for the UE, or that the PDCCH in the second time interval is associated with a duplicate transmission. In some examples, the means for configuring the power saving state of the UE may include means for activating the power saving state after receiving at least one of: the first transmission, a PDSCH that is scheduled by the first transmission, or a combination thereof; and means for deactivating the power saving state: after a time indicated by the indication of the subsequent PDCCH transmission, after a timing of the PDCCH and an associated PDSCH in the second time interval, or to receive the PDCCH in the second time interval. In some examples, the apparatus may include means for receiving the PDCCH on the beam based at least in part on the indication of the subsequent PDCCH transmission. In some examples, the apparatus may include means for determining, from the indication of the subsequent PDCCH transmission, at least one of: a timing of the PDCCH, a frequency of the PDCCH, or a combination thereof. In some examples, configuring the power saving state of the UE may include means for activating the power saving state after receiving at least one of: the first transmission, a PDSCH that is scheduled by the first transmission, or a combination thereof; and means for deactivating the power saving state to receive the PDCCH.

In some examples, the apparatus may include means for receiving, on the beam, an indication of subsequent PDCCH indication enablement. The indication of subsequent PDCCH indication enablement may be received in at least one of: a MIB, a minimum SI transmission, a SIB, RRC signaling, or a combination thereof. In some examples, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, or a combination thereof. In some examples, the apparatus may include means for transmitting a random access preamble on the beam, and the first transmission and the PDCCH may be received on the beam in a RAR window, based at least in part on the transmission of the random access preamble.

In one example, another apparatus for wireless communication at a UE is described. The apparatus may include a processor, memory in electronic communication with the processor, and instructions stored in the memory. The instructions may be executable by the processor to receive, by the UE, a first transmission on a beam over a radio frequency spectrum during a first time interval. The first transmission may include an indication of a subsequent PDCCH transmission on the beam. The indication may include information about a PDCCH in a second time interval subsequent to the first time interval. The instructions may also be executable by the processor to configure a power saving state of the UE based at least in part on the indication.

In some examples of the apparatus, the instructions may be executable by the processor to determine, based at least in part on the indication of the subsequent PDCCH transmission, at least one of: that the PDCCH in the second time interval is associated with a second transmission separate from the first transmission, that the PDCCH in the second time interval does not schedule a transmission for the UE, or that the PDCCH in the second time interval is associated with a duplicate transmission. In some examples, the instructions executable by the processor to configure the power saving state of the UE may include instructions executable by the processor to activate the power saving state after receiving at least one of: the first transmission, a PDSCH that is scheduled by the first transmission, or a combination thereof; and deactivate the power saving state: after a time indicated by the indication of the subsequent PDCCH transmission, after a timing of the PDCCH and an associated PDSCH in the second time interval, or to receive the PDCCH in the second time interval. In some examples, the instructions may be executable by the processor to receive the PDCCH on the beam based at least in part on the indication of the subsequent PDCCH transmission. In some examples, the instructions may be executable by the processor to determine, from the indication of the subsequent PDCCH transmission, at least one of: a timing of the PDCCH, a frequency of the PDCCH, or a combination thereof. In some examples, the instructions executable by the processor to configure the power saving state of the UE may include instructions executable by the processor to activate the power saving state after receiving at least one of: the first transmission, a PDSCH that is scheduled by the first transmission, or a combination thereof; and deactivate the power saving state to receive the PDCCH.

In some examples of the apparatus, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, or a combination thereof. In some examples, the apparatus may include instructions executable by the processor to transmit a random access preamble on the beam, and the first transmission and the PDCCH may be received on the beam in a RAR window, based at least in part on the transmission of the random access preamble.

In one example, a computer program product including a non-transitory computer-readable medium is described. The non-transitory computer-readable medium may include instructions to receive, by a UE, a first transmission on a beam over a radio frequency spectrum during a first time interval. The first transmission may include an indication of a subsequent PDCCH transmission on the beam. The indication may include information about a PDCCH in a second time interval subsequent to the first time interval. The non-transitory computer-readable medium may also include instructions to configure a power saving state of the UE based at least in part on the indication.

In some examples of the computer program product, the non-transitory computer-readable medium may include instructions to determine, based at least in part on the indication of the subsequent PDCCH transmission, at least one of: that the PDCCH in the second time interval is associated with a second transmission separate from the first transmission, that the PDCCH in the second time interval does not schedule a transmission for the UE, or that the PDCCH in the second time interval is associated with a duplicate transmission. In some examples, the instructions to configure the power saving state of the UE may include instructions to activate the power saving state after receiving at least one of: the first transmission, a PDSCH that is scheduled by the first transmission, or a combination thereof; and instructions to deactivate the power saving state: after a time indicated by the indication of the subsequent PDCCH transmission, after a timing of the PDCCH and an associated PDSCH in the second time interval, or to receive the PDCCH in the second time interval. In some examples, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, or a combination thereof.

In one example, a method for wireless communication at a network access device is described. The method may include transmitting, to at least one UE, a first transmission on a beam over a radio frequency spectrum during a first time interval. The first transmission may include an indication of a subsequent PDCCH transmission on the beam. The indication of the subsequent PDCCH transmission may include information about a PDCCH in a second time interval subsequent to the first time interval. The method may also include transmitting the PDCCH on the beam during the second time interval.

In some examples, the method may include transmitting, on the beam, an indication of subsequent PDCCH indication enablement. The indication of subsequent PDCCH indication enablement may be transmitted in at least one of: a MIB, a minimum SI transmission, a SIB, RRC signaling, or a combination thereof. In some examples, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In some examples, the method may include receiving a random access preamble on the beam, and the first transmission and the PDCCH may be transmitted on the beam in a RAR window, based at least in part on the reception of the random access preamble.

In one example, an apparatus for wireless communication at a network access device is described. The apparatus may include means for transmitting, to at least one UE, a first transmission on a beam over a radio frequency spectrum during a first time interval. The first transmission may include an indication of a subsequent PDCCH transmission on the beam. The indication of the subsequent PDCCH transmission may include information about a PDCCH in a second time interval subsequent to the first time interval. The apparatus may also include means for transmitting the PDCCH on the beam during the second time interval.

In some examples, the apparatus may include means for transmitting, on the beam, an indication of subsequent PDCCH indication enablement. The indication of subsequent PDCCH indication enablement may be transmitted in at least one of: a MIB, a minimum SI transmission, a SIB, RRC signaling, or a combination thereof. In some examples, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In some examples, the apparatus may include means for receiving a random access preamble on the beam, and the first transmission and the PDCCH may be transmitted on the beam in a RAR window, based at least in part on the reception of the random access preamble.

In one example, another apparatus for wireless communication at a network access device is described. The apparatus may include a processor, memory in electronic communication with the processor, and instructions stored in the memory. The instructions may be executable by the processor to transmit, to at least one UE, a first transmission on a beam over a radio frequency spectrum during a first time interval. The first transmission may include an indication of a subsequent PDCCH transmission on the beam. The indication of the subsequent PDCCH transmission may include information about a PDCCH in a second time interval subsequent to the first time interval. The instructions may also be executable by the processor to transmit the PDCCH on the beam during the second time interval.

In some examples of the apparatus, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In some examples, the instructions may be executable by the processor to receive a random access preamble on the beam, and the first transmission and the PDCCH may be transmitted on the beam in a RAR window, based at least in part on the reception of the random access preamble.

In one example, another computer program product including a non-transitory computer-readable medium is described. The non-transitory computer-readable medium may include instructions to transmit, to at least one UE, a first transmission on a beam over a radio frequency spectrum during a first time interval. The first transmission may include an indication of a subsequent PDCCH transmission on the beam. The indication of the subsequent PDCCH transmission may include information about a PDCCH in a second time interval subsequent to the first time interval. The non-transitory computer-readable medium may also include instructions to transmit the PDCCH on the beam during the second time interval.

In some examples of the computer program product, the first transmission may include another PDCCH, a PDSCH, or a combination thereof. In some examples, the indication of the subsequent PDCCH transmission may include at least one of: a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The present disclosure describes techniques for indicating or using information about a subsequent PDCCH transmission. The information may be used to configure a power saving state of the UE. For example, when a UE determines, from the information about the subsequent PDCCH transmission, that a subsequent PDCCH is associated with a new or duplicate transmission, or that the subsequent PDCCH does not schedule a transmission for the UE, the UE may activate a power saving state of the UE to conserve power (e.g., battery power).

In a wireless communication system in which a network access device communicates with one or more UEs on one or more beams (e.g., via single beam or multiple beam transmissions), the information about the subsequent PDCCH transmission may include information that enables a UE to determine whether the UE should remain awake (or whether the UE should awake after activating a power saving state) to receive the subsequent PDCCH. The information about the subsequent PDCCH transmission may also or alternatively include information that enables the UE to determine whether additional data should be expected on a same beam, or information that enables the UE to determine when (in terms of time interval), where (in terms of frequency), or how (in terms of beam pattern) to receive additional data.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
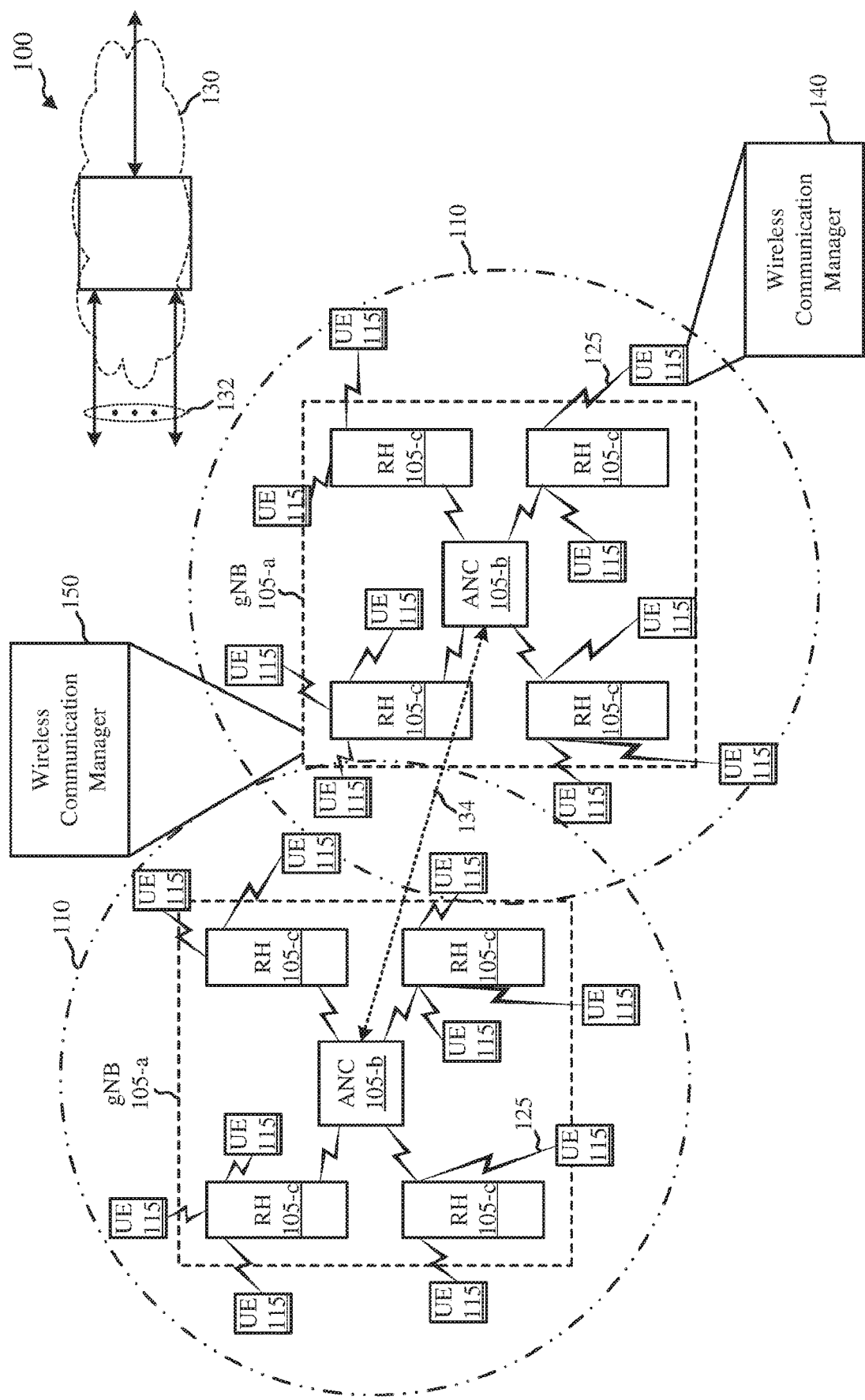
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include network access devices 105 (e.g., gNBs 105-a, ANCs 105-b, and/or RHs 105-c), UEs 115, and a core network 130. The core network 130 may provide user authentication, access authorization, tracking, Internet Protocol (IP) connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c). In an alternative configuration of the wireless communication system 100, the functionality of an ANC 105-b may be provided by a RH 105-c or distributed across the RHs 105-c of an gNB 105-a. In another alternative configuration of the wireless communication system 100 (e.g., an LTE/LTE-A configuration), the RHs 105-c may be replaced with base stations, the ANCs 105-b may be replaced by base station controllers (or links to the core network 130), and the gNBs 105-a may be replaced by eNBs. In some examples, the wireless communication system 100 may include a mix of RHs 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or RHs 105-c may have similar frame timing, and transmissions from different gNBs 105-a and/or RHs 105-c may be approximately aligned in time. For asynchronous operation, the gNBs 105-a and/or RHs 105-c may have different frame timings, and transmissions from different gNBs 105-a and/or RHs 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a RH 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of network access devices 105 (e.g., gNBs 105-a, RHs 105-c, eNBs, base stations, access points, macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a RH 105-c, and/or downlinks (DLs), from a RH 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., RHs 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

At times, a UE 115 may perform an initial access (or initial acquisition) procedure with a network access device 105. When performing the initial access procedure, the UE 115 may search for a synchronization channel transmitted by the network access device 105. The synchronization channel may include information synchronizing the UE 115 with the network access device 105, so that the UE 115 may communicate with the network access device 105. After synchronizing with the network access device 105, the UE 115 may initiate a random access procedure with the network by transmitting a random access preamble to the network.

In some examples, a UE 115 may include a wireless communication manager 140. The wireless communication manager 140 may be used by the UE 115 to receive a first transmission on a beam over a radio frequency spectrum during a first time interval. The first transmission may include an indication of a subsequent PDCCH transmission on the beam. The indication may include information about a PDCCH in a second time interval subsequent to the first time interval. The wireless communication manager 140 may also be used by the UE 115 to configure a power saving state of the UE based at least in part on the indication. Examples of the wireless communication manager 140 are described with reference to FIGS. 4 and 5.

In some examples, a network access device 105 may include a wireless communication manager 150. The wireless communication manager 150 may be used by the network access device 105 to transmit, to at least one UE, a first transmission on a beam over a radio frequency spectrum during a first time interval. The first transmission may include an indication of a subsequent PDCCH transmission on the beam. The indication of the subsequent PDCCH transmission may include information about a PDCCH in a second time interval subsequent to the first time interval. The wireless communication manager 150 may also be used by the network access device 105 to transmit the PDCCH on the beam during the second time interval. Examples of the wireless communication manager 150 are described with reference to FIGS. 7 and 8.

Figure 2:
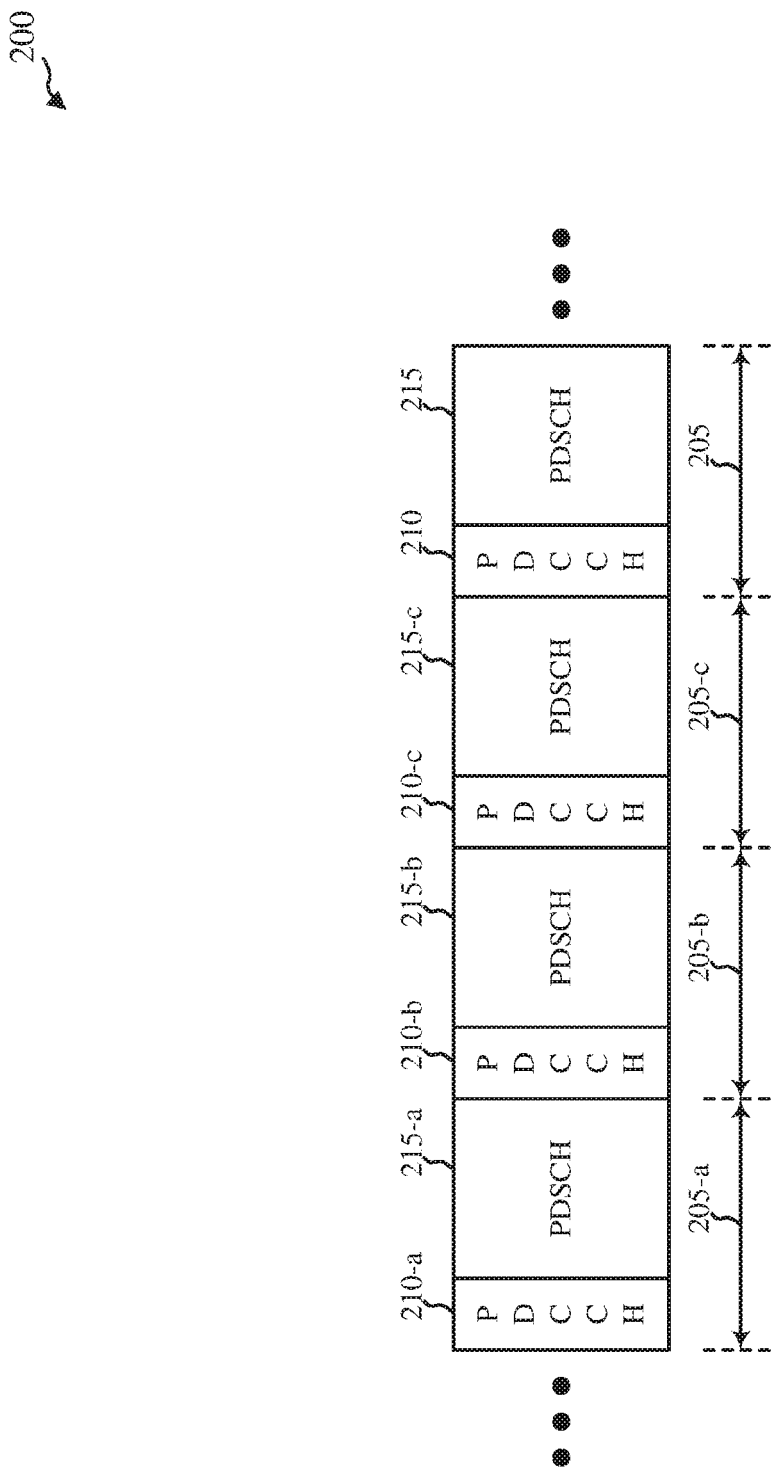
FIG. 2 shows a timeline of transmissions over a radio frequency spectrum, in accordance with various aspects of the present disclosure.

FIG. 2 shows a timeline 200 of transmissions over a radio frequency spectrum, in accordance with various aspects of the present disclosure. The transmissions may occur in a plurality of time intervals 205 (e.g., in a plurality of subframes, slots, or mini-slots). The transmissions may or may not be transmitted on the same or different bands, subbands, carrier(s), or subcarrier(s), and FIG. 2 is not intended to imply a frequency relationship between different transmissions.

The transmissions include downlink transmissions, and in some examples may include uplink transmissions. Uplink transmissions may be multiplexed with the downlink transmissions and/or transmitted on the same or different bands, subbands, carrier(s), or subcarrier(s) as the downlink transmissions. In some examples, some or all of the transmissions may be beamformed transmissions (e.g., single beam transmissions or multiple beam transmissions). The transmissions may include broadcast transmissions (e.g., using a common beam) or UE-specific transmissions (e.g., unicast or multicast transmissions).

By way of example, the downlink transmissions may include downlink control transmissions (e.g., PDCCH transmissions (PDCCHs)) and downlink data transmissions (e.g., PDSCH transmissions (PDSCHs)). A downlink time interval may include a downlink control transmission and a downlink data transmission (e.g., a PDCCH 210 and PDSCH 215, as shown).

A first transmission during a first time interval 205-a may include an indication of a subsequent PDCCH transmission. The indication of the subsequent PDCCH transmission may be included in a PDCCH 210-a or a PDSCH 215-a. The indication may include information about a PDCCH 210-b in a second time interval 205-b subsequent to the first time interval 205-a. The indication and the PDCCH 210-b may be transmitted on the same beam. The second time interval 205-b may be the next time interval after the first time interval 205-a, a next downlink time interval after the first time interval 205-a, or a time interval separated from the first time interval 205-a by one or more other downlink time intervals or uplink time intervals. By way of example, the second time interval 205-b is shown in FIG. 2 to be the next time downlink time interval after the first time interval 205-a.

The information included in the indication of the subsequent PDCCH transmission may include, for example, a first indication of a timing of the PDCCH 210-b, a second indication of a frequency of the PDCCH 210-b, a third indication of whether the PDCCH 210-b is associated with a new transmission or a duplicate transmission (e.g., a repeating transmission, such as a minimum system information (SI) transmission), a fourth indication of a type of data associated with the PDCCH 210-b, or a fifth indication of an intended recipient of the PDCCH 210-b or an associated PDSCH 215-b. The first indication of the timing of the PDCCH 210-b may include indicators of a start time or time window. In some examples, the first indication of the timing of the PDCCH 210-b may include an identifier of a subframe, a slot, or a mini-slot. In some examples, the subframe, slot, or mini-slot may be identified relative to a subframe, slot, or mini-slot in which the indication of the subsequent PDCCH transmission is transmitted. In some examples, the second indication of the frequency of the PDCCH 210-*b* may include an indication of a tone, set of tones, physical resource block (PRB), or frequency range. In some examples, the fourth indication of the type of data associated with the PDCCH 210-*b* may include an indication of a first type of data included in the PDCCH 210-*b* or a second type of data included in a PDSCH 215-*b* associated with the PDCCH 210-*b*. In a system information context, and in some examples, the type of data indicated by the fourth indication may be a system information type (e.g., SIB1, SIB2, etc.).

A UE that receives the first transmission may decode the indication of the subsequent PDCCH transmission, determine information about the PDCCH 210-*b* in the second time interval 205-*b*, and configure a power saving state of the UE based at least in part on the indication. The power saving state may be a state in which a receiver is turned OFF or transitioned to a lower power state (e.g., an inactive state). When the UE determines, based at least in part on the indication, that the PDCCH 210-*b* in the second time interval 205-*b* is associated with a second transmission separate from the first transmission, the UE may activate a power saving state after receiving the first transmission (i.e., after receiving the transmission that includes the indication of the subsequent PDCCH transmission), a PDSCH 215-*a* that is scheduled by the first transmission (e.g., when the first transmission includes a PDCCH 210-*a*), or a combination thereof. The UE may activate the power saving state in a similar manner when the UE determines, based at least in part on the indication, that the PDCCH 210-*b* in the second time interval 205-*b* does not schedule a transmission for the UE, or that the PDCCH 210-*b* in the second time interval 205-*b* is associated with a duplicate transmission (e.g., a transmission that the UE has already received). In some examples, the indication of the subsequent PDCCH transmission may explicitly indicate that the PDCCH 210-*b* is associated with a duplicate transmission. In some examples, the indication of the subsequent PDCCH transmission may include information (e.g., an indication of a type of data included in the PDCCH 210-*b* or an associated PDSCH 215-*b*) that enables the UE to determine that the PDCCH 210-*b* or associated PDSCH 215-*b* contains a duplicate of data already received by the UE. While in the power saving state, the UE may refrain from decoding control and/or data transmissions (e.g., one or more PDCCHs 210 or PDSCHs 215). After activating the power saving state, the UE may deactivate the power saving state after a time indicated by the indication of the subsequent PDCCH transmission, or after a timing of the PDCCH 210-*b* and an associated PDSCH 215-*b* in the second time interval 205-*b*. Alternatively, the UE may deactivate the power saving state to receive the PDCCH 210-*b* in the second time interval 205-*b*. In some examples, the UE may deactivate the power saving state, to receive the PDCCH 210-*b* in the second time interval 205-*b*, even after determining that the UE does not need the PDCCH 210-*b* or an associated PDSCH 215-*b*, to obtain a next indication of a subsequent PDCCH transmission (e.g., an indication including information about a PDCCH 210-*c* in a third time interval 205-*c* subsequent to the second time interval 205-*b*).

When the UE determines, based at least in part on the indication of the subsequent PDCCH transmission, that the PDCCH 210-*b* in the second time interval 205-*b* is associated with the first transmission (or associated with a new transmission that the UE wants to or is scheduled to receive), the UE may activate a power saving state after receiving the first transmission (i.e., after receiving the transmission that includes the indication of the subsequent PDCCH transmission), a PDSCH 215-*a* that is scheduled by the first transmission (e.g., when the first transmission includes a PDCCH 210-*a*), or a combination thereof. The UE may then deactivate the power saving sate to receive the PDCCH 210-*b* in the second time interval 205-*b*. Alternatively, the UE may not activate the power saving state after receiving the first transmission, and may remain awake until (at least) the PDCCH 210-*b* in the second time interval 205-*b* is received. In some examples, the UE may determine when to deactivate the power saving state and/or when to receive the PDCCH 210-*b* in the second time interval based at least in part on a timing of the PDCCH 210-*b* or a frequency of the PDCCH 210-*b* indicated in the indication of the subsequent PDCCH.

In some examples, a network access device may transmit, and a UE may receive, an indication of subsequent PDCCH transmission enablement. The indication of subsequent PDCCH indication enablement may be transmitted and received in a master information block (MIB), a minimum SI transmission, a system information block (SIB), radio resource control (RRC) signaling, or a combination thereof.

Figure 3:
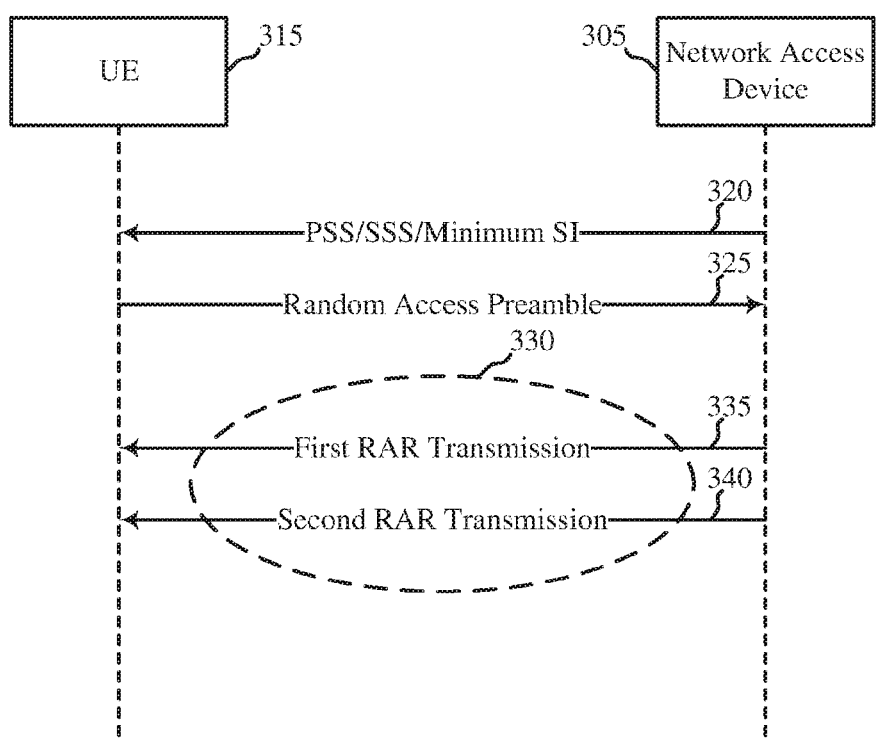
FIG. 3 shows a message flow between a UE and network access device during a random access procedure, in accordance with various aspects of the present disclosure.

FIG. 3 shows a message flow between a UE 315 and network access device 305 during a random access procedure, in accordance with various aspects of the present disclosure. The UE 315 and network access device 305 may be examples of aspects of the UEs 115 and network access devices 105 described with reference to FIG. 1.

At 320, at one or more times, the network access device 305 may broadcast one or more synchronization signals (e.g., a primary synchronization signal (PSS) and a secondary synchronization signal (SSS)) and/or a minimum SI transmission over a radio frequency spectrum. The UE 315 may receive the synchronization signals and/or minimum SI and use the synchronization signals and/or minimum SI to synchronize with the network access device 305.

At 325, the UE 315 may transmit a random access preamble (e.g., a Message 1 (Msg1)) to the network access device 305. The random access preamble may be transmitted with, or serve as an indication of, a request for system information. In some examples, the UE 315 may transmit the random access preamble over the radio frequency spectrum on a first beam (i.e., in a beamformed transmission).

Based at least in part on receiving the random access preamble from the UE 315 (and possibly from other UEs), the network access device 305 may transmit a random access response (RAR) to the UE 315. The RAR may be transmitted within a RAR window 330 and may be carried in one or more transmissions of the network access device 305. The transmission(s) may be broadcast on one or more beams (e.g., the first beam, a second beam, or a plurality of beams), or transmitted over a beam or beams directed to the UE 315. In some examples, each transmission included in the RAR may be broadcast/transmitted in a different time interval (e.g., in a different slot or mini-slot). By way of example, the RAR transmitted by the network access device 305 is shown in FIG. 3 to include two transmissions within the RAR window 330—a first RAR transmission 335, and a second RAR transmission 340.

The first RAR transmission 335 may include a first PDCCH and a first PDSCH. The first PDCCH or first PDSCH may include a first indication of a subsequent PDCCH transmission. The first indication may include information about a second PDCCH in the second RAR transmission 340. The information about the second PDCCH may include any of the information described with reference to FIG. 2.

The second RAR transmission 340 may include a second PDCCH and a second PDSCH. The second PDCCH or second PDSCH may include a second indication of a subsequent PDCCH transmission. The second indication may include information about a third PDCCH, and may indicate, for example, that the third PDCCH is associated with a transmission other than the first RAR transmission 335, or that the third PDCCH does not schedule a transmission for the UE, or that the third PDCCH is associated with a different type of data (e.g., a type of data that does not pertain to a RAR or SI transmission).

Based at least in part on the first indication and the second indication, the UE 315 may configure a power saving state of the UE 315. In some examples, the power saving state may be configured (e.g., activated and deactivated) as described with reference to FIG. 2.

Figure 4:
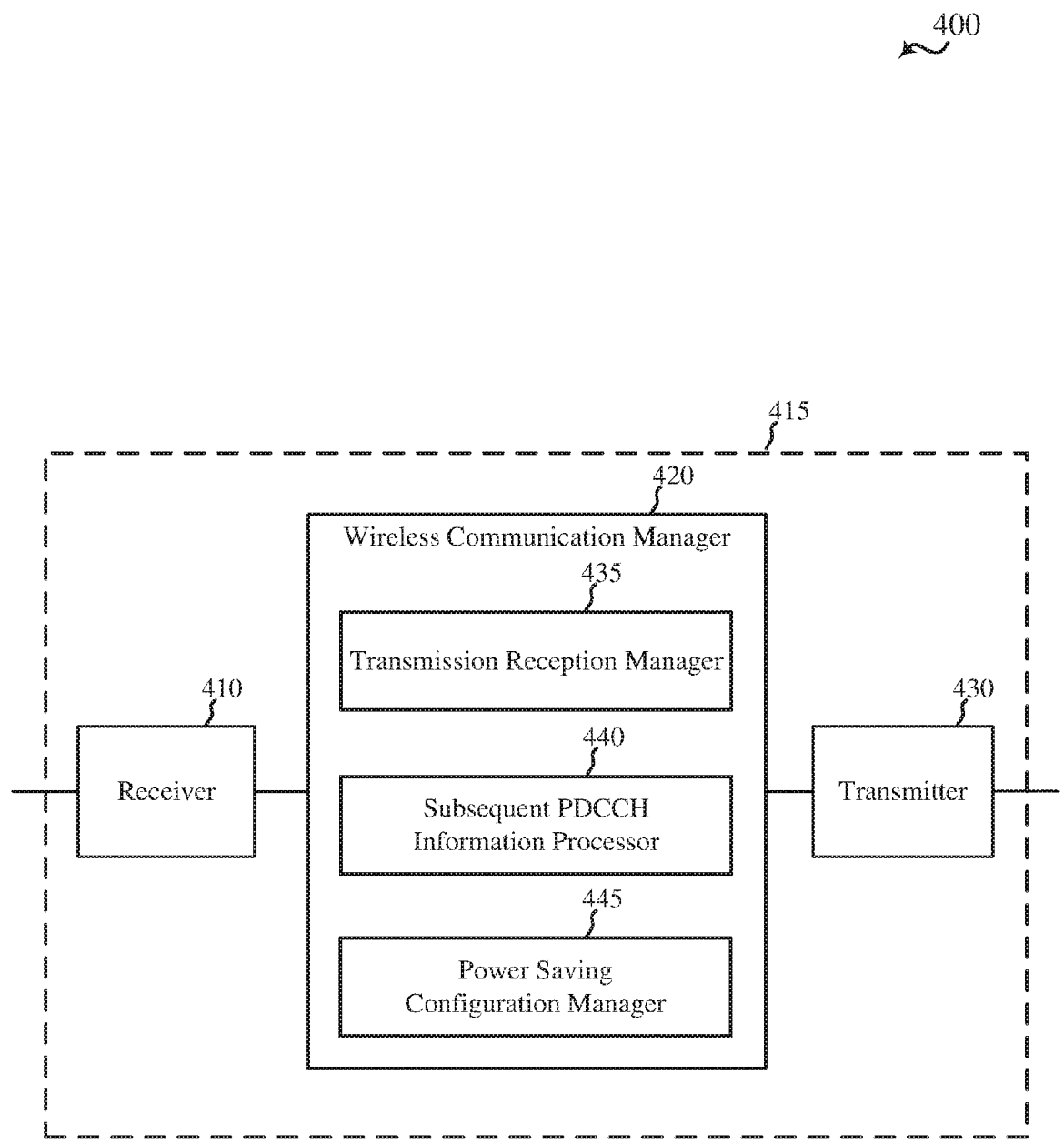
FIG. 4 shows a block diagram of an apparatus for use in wireless communication, in accordance with various aspects of the present disclosure.

FIG. 4 shows a block diagram 400 of an apparatus 415 for use in wireless communication, in accordance with various aspects of the present disclosure. The apparatus 415 may be an example of aspects of one or more of the UEs described with reference to FIG. 1 or 3. The apparatus 415 may also be or include a processor. The apparatus 415 may include a receiver 410, a wireless communication manager 420, or a transmitter 430. Each of these components may be in communication with each other.

The components of the apparatus 415 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 410 may include at least one radio frequency (RF) receiver, such as at least one RF receiver operable to receive transmissions over a radio frequency spectrum. In some examples, the radio frequency spectrum may be used for communicating as described with reference to FIG. 1, 2, or 3. The receiver 410 may be used to receive various types of data or control signals (i.e., transmissions) over one or more communication links of a wireless communication system, such as one or more communication links of the wireless communication system 100 described with reference to FIG. 1.

In some examples, the transmitter 430 may include at least one RF transmitter, such as at least one RF transmitter operable to transmit over the radio frequency spectrum. In some examples, the radio frequency spectrum may be used for communicating as described with reference to FIG. 1, 2, or 3. The transmitter 430 may be used to transmit various types of data or control signals (i.e., transmissions) over one or more communication links of a wireless communication system, such as one or more communication links of the wireless communication system 100 described with reference to FIG. 1.

In some examples, the wireless communication manager 420 may be used to manage one or more aspects of wireless communication for the apparatus 415. In some examples, part of the wireless communication manager 420 may be incorporated into or shared with the receiver 410 or the transmitter 430. In some examples, the wireless communication manager 420 may include a transmission reception manager 435, a subsequent PDCCH information processor 440, or a power saving configuration manager 445.

The transmission reception manager 435 may be used to receive a first transmission on a beam over the radio frequency spectrum during a first time interval. The first transmission may include an indication of a subsequent PDCCH transmission on the beam. The indication may be processed by the subsequent PDCCH information processor 440. The indication may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. The power saving configuration manager 445 may be used to configure a power saving state of the UE based at least in part on the indication.

Figure 5:
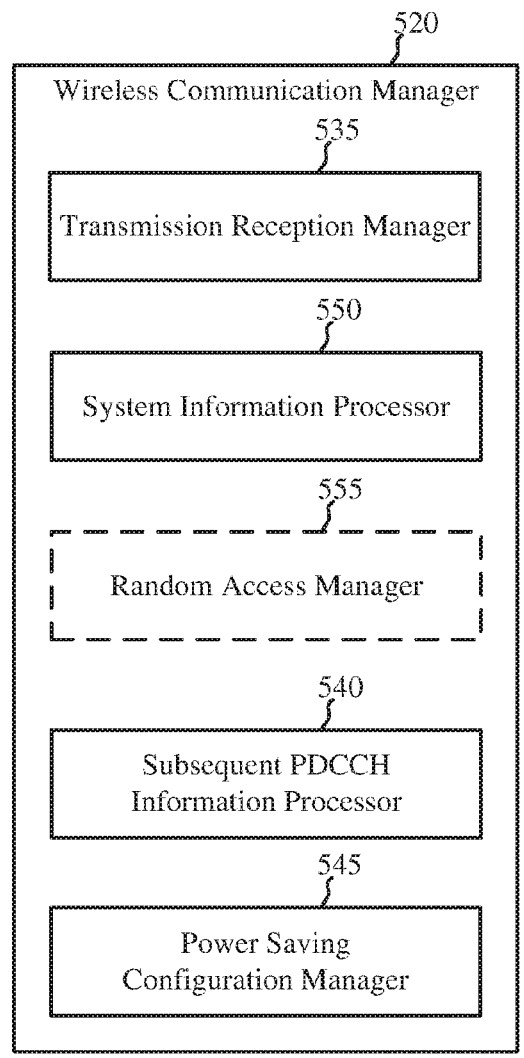
FIG. 5 shows a block diagram of a wireless communication manager for use in wireless communication, in accordance with various aspects of the present disclosure.

FIG. 5 shows a block diagram 500 of a wireless communication manager 520 for use in wireless communication, in accordance with various aspects of the present disclosure. The wireless communication manager 520 may be an example of aspects of the wireless communication manager described with reference to FIG. 1 or 4.

The components of the wireless communication manager 520 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 520 may be used to manage one or more aspects of wireless communication for a wireless device, such as one of the UEs or apparatuses described with reference to FIG. 1, 3, or 4. In some examples, part of the wireless communication manager 520 may be incorporated into or shared with a receiver or a transmitter (e.g., the receiver 410 or the transmitter 430 described with reference to FIG. 4). In some examples, the wireless communication manager 520 may include a transmission reception manager 535, a system information processor 550, an optional random access manager 555, a subsequent PDCCH information processor 540, or a power saving configuration manager 545.

The transmission reception manager 535 may be used to receive, on a beam, an indication of subsequent PDCCH indication enablement. The indication of subsequent PDCCH indication enablement may be received in a MIB, a minimum SI transmission, a SIB, RRC signaling, or a combination thereof. The indication of subsequent PDCCH indication enablement may be processed by the system information processor 550.

The transmission reception manager 535 may be used to receive a first transmission on the beam over the radio frequency spectrum during a first time interval. The first transmission may include an indication of a subsequent PDCCH transmission on the beam. The indication may be processed by the subsequent PDCCH information processor 540. The indication may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof.

In some examples, the subsequent PDCCH information processor 540 may be used to determine, from the indication of the subsequent PDCCH transmission, a timing of the PDCCH, a frequency of the PDCCH, or a combination thereof.

The power saving configuration manager 545 may be used to configure a power saving state of the UE based at least in part on the indication.

In some examples, the subsequent PDCCH information processor 540 may be used to determine, based at least in part on the indication of the subsequent PDCCH transmission, that the PDCCH in the second time interval is associated with a second transmission separate from the first transmission, or that the PDCCH in the second time interval does not schedule a transmission for the UE, or that the PDCCH in the second time interval is associated with a duplicate transmission. In some of these examples, the power saving configuration manager 545 may be used to activate the power saving state after receiving at least one of: the first transmission, a PDSCH that is scheduled by the first transmission, or a combination thereof. The power saving configuration manager 545 may also be used to deactivate the power saving state after a time indicated by the indication of the subsequent PDCCH transmission, or after a timing of the PDCCH and an associated PDSCH in the second time interval, or to receive the PDCCH in the second time interval.

In some examples, the transmission reception manager 535 may be used to receive the PDCCH on the beam based at least in part on the indication of the subsequent PDCCH transmission. In some of these examples, the power saving configuration manager 545 may be used to activate the power saving state after receiving at least one of: the first transmission, a PDSCH that is scheduled by the first transmission, or a combination thereof. The power saving configuration manager 545 may also be used to deactivate the power saving state to receive the PDCCH.

In some examples, the random access manager 555 may be used to transmit a random access preamble on the beam, and the transmission reception manager 535 may be used to receive the first transmission and the PDCCH on the beam in a RAR window, based at least in part on the transmission of the random access preamble.

Figure 6:
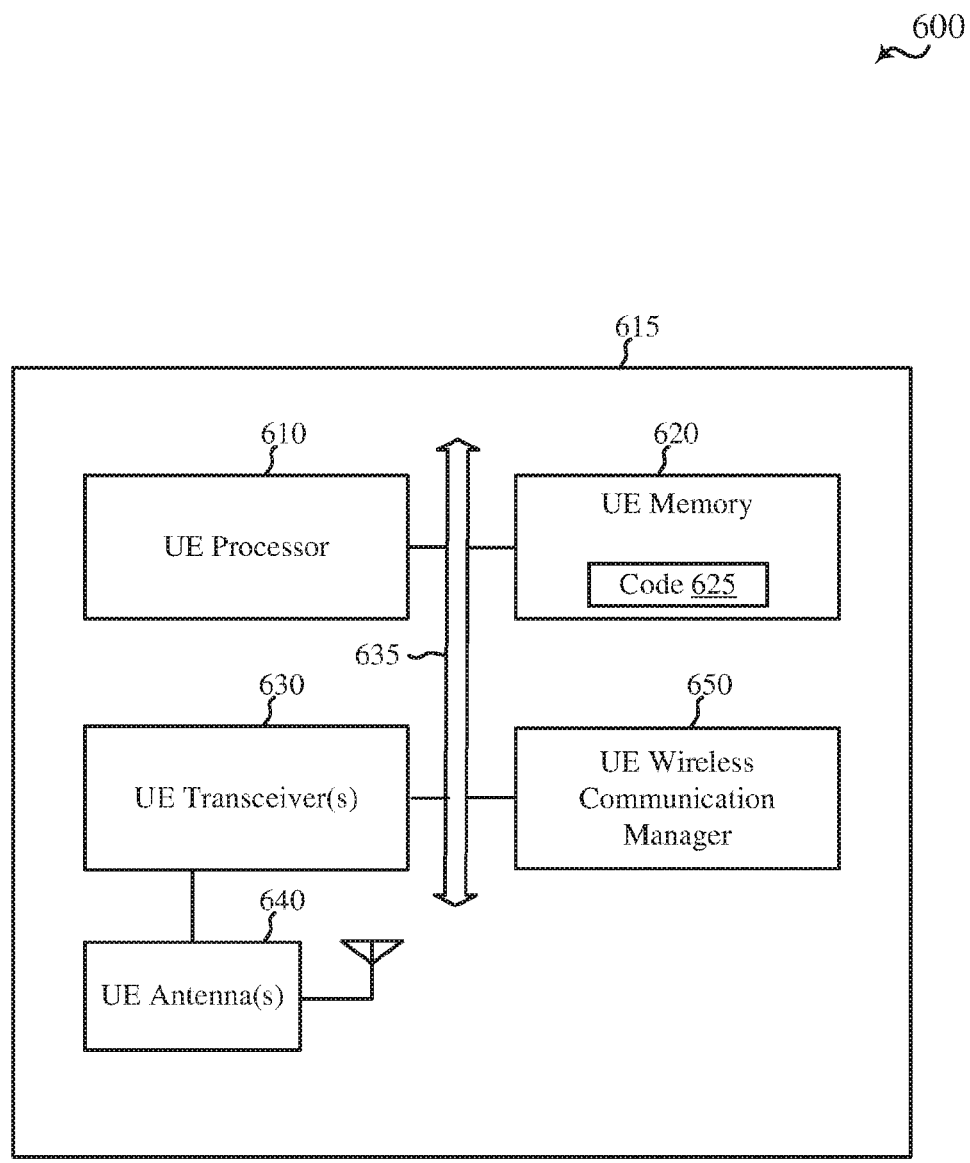
FIG. 6 shows a block diagram of a UE for use in wireless communication, in accordance with various aspects of the present disclosure.

FIG. 6 shows a block diagram 600 of a UE 615 for use in wireless communication, in accordance with various aspects of the present disclosure. The UE 615 may be included or be part of a personal computer (e.g., a laptop computer, a netbook computer, a tablet computer, etc.), a cellular telephone, a PDA, a DVR, an internet appliance, a gaming console, an e-reader, etc. The UE 615 may, in some examples, have an internal power supply (not shown), such as a small battery, to facilitate mobile operation. In some examples, the UE 615 may be an example of aspects of one or more of the UEs described with reference to FIG. 1 or 3, or aspects of the apparatus described with reference to FIG. 4. The UE 615 may be configured to implement at least some of the UE or apparatus techniques and functions described with reference to FIG. 1, 2, 3, 4, or 5.

The UE 615 may include a UE processor 610, a UE memory 620, at least one UE transceiver (represented by UE transceiver(s) 630), at least one UE antenna (represented by UE antenna(s) 640), or a UE wireless communication manager 650. Each of these components may be in communication with each other, directly or indirectly, over one or more buses 635.

The UE memory 620 may include random access memory (RAM) or read-only memory (ROM). The UE memory 620 may store computer-readable, computer-executable code 625 containing instructions that are configured to, when executed, cause the UE processor 610 to perform various functions described herein related to wireless communication, including, for example, receiving a transmission including an indication of a subsequent PDCCH transmission, configuring a power saving state of the UE 615 based at least in part on the indication, etc. Alternatively, the computer-executable code 625 may not be directly executable by the UE processor 610 but be configured to cause the UE 615 (e.g., when compiled and executed) to perform various of the functions described herein.

The UE processor 610 may include an intelligent hardware device, e.g., a central processing unit (CPU), a microcontroller, an ASIC, etc. The UE processor 610 may process information received through the UE transceiver(s) 630 or information to be sent to the UE transceiver(s) 630 for transmission through the UE antenna(s) 640. The UE processor 610 may handle, alone or in connection with the UE wireless communication manager 650, various aspects of communicating over (or managing communications over) a radio frequency spectrum.

The UE transceiver(s) 630 may include a modem configured to modulate packets and provide the modulated packets to the UE antenna(s) 640 for transmission, and to demodulate packets received from the UE antenna(s) 640. The UE transceiver(s) 630 may, in some examples, be implemented as one or more UE transmitters and one or more separate UE receivers. The UE transceiver(s) 630 may be configured to communicate bi-directionally, via the UE antenna(s) 640, with one or more network access devices or apparatuses, such as one or more of the network access devices described with reference to FIG. 1 or 3, or one or more of the apparatuses described with reference to FIG. 4. While the UE 615 may include a single UE antenna, there may be examples in which the UE 615 may include multiple UE antennas 640.

The UE wireless communication manager 650 may be configured to perform or control some or all of the UE or apparatus techniques or functions described with reference to FIG. 1, 2, 3, 4, or 5 related to wireless communication over a radio frequency spectrum. The UE wireless communication manager 650, or portions of it, may include a processor, or some or all of the functions of the UE wireless communication manager 650 may be performed by the UE processor 610 or in connection with the UE processor 610. In some examples, the UE wireless communication manager 650 may be an example of the wireless communication manager described with reference to FIG. 1, 4, or 5.

Figure 7:
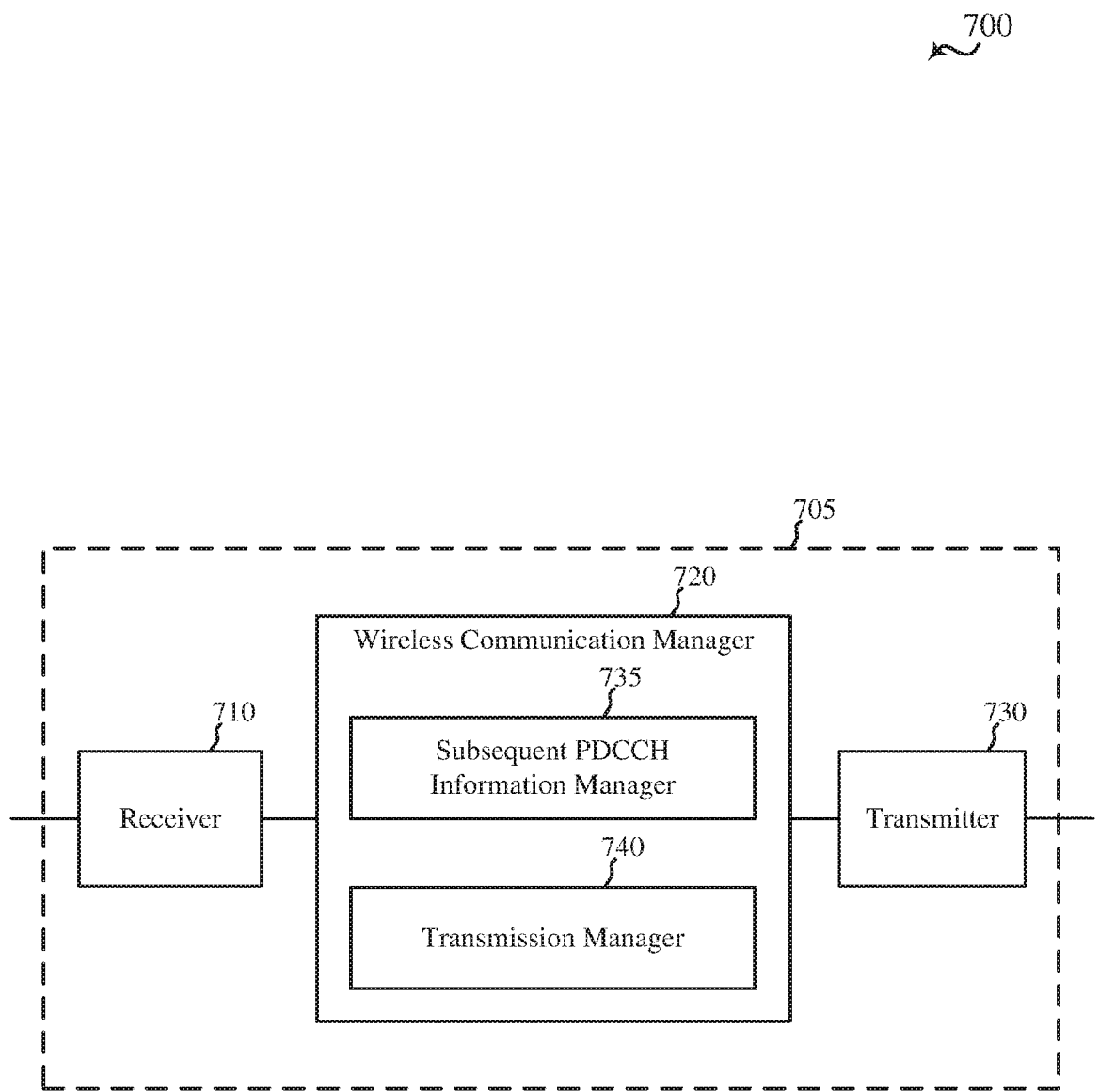
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the network access devices described with reference to FIG. 1 or 3. The apparatus 705 may also be or include a processor. The apparatus 705 may include a receiver 710, a wireless communication manager 720, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a radio frequency spectrum. In some examples, the radio frequency spectrum may be used for communicating as described with reference to FIG. 1, 2, or 3. The receiver 710 may be used to receive various types of data or control signals (i.e., transmissions) over one or more communication links of a wireless communication system, such as one or more communication links of the wireless communication system 100 described with reference to FIG. 1.

In some examples, the transmitter 730 may include at least one RF transmitter, such as at least one RF transmitter operable to transmit over the radio frequency spectrum. In some examples, the radio frequency spectrum may be used for communicating as described with reference to FIG. 1, 2, or 3. The transmitter 730 may be used to transmit various types of data or control signals (i.e., transmissions) over one or more communication links of a wireless communication system, such as one or more communication links of the wireless communication system 100 described with reference to FIG. 1.

In some examples, the wireless communication manager 720 may be used to manage one or more aspects of wireless communication for the apparatus 705. In some examples, part of the wireless communication manager 720 may be incorporated into or shared with the receiver 710 or the transmitter 730. In some examples, the wireless communication manager 720 may include a subsequent PDCCH information manager 735 or a transmission manager 740.

The transmission manager 740 may be used to include transmit, to at least one UE, a first transmission on a beam over a radio frequency spectrum during a first time interval, The first transmission may include an indication of a subsequent PDCCH transmission on the beam. The indication may be formatted by the subsequent PDCCH information manager 735. The indication of the subsequent PDCCH transmission may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. The transmission manager 740 may also be used to transmit the PDCCH on the beam during the second time interval.

Figure 8:
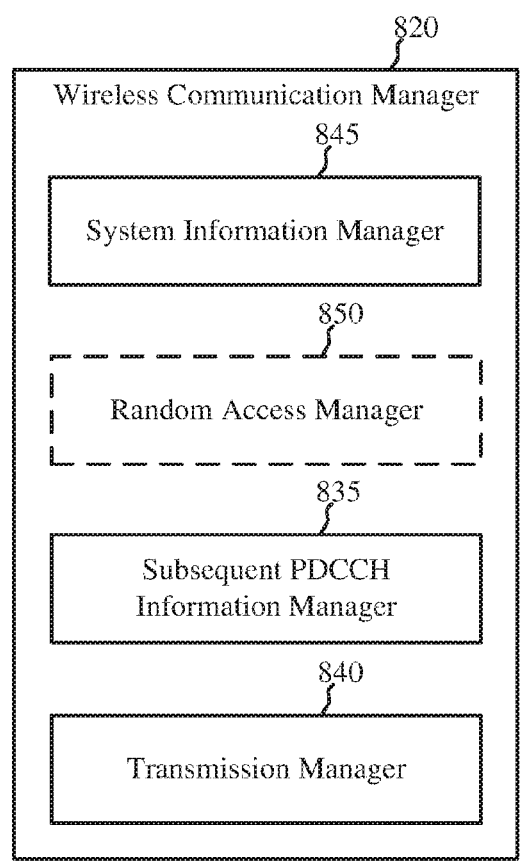
FIG. 8 shows a block diagram of a wireless communication manager for use in wireless communication, in accordance with various aspects of the present disclosure.

FIG. 8 shows a block diagram 800 of a wireless communication manager 820 for use in wireless communication, in accordance with various aspects of the present disclosure. The wireless communication manager 820 may be an example of aspects of the wireless communication manager described with reference to FIG. 1 or 7.

The components of the wireless communication manager 820 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 820 may be used to manage one or more aspects of wireless communication for a wireless device, such as one of the network access devices or apparatuses described with reference to FIG. 1, 3, or 7. In some examples, part of the wireless communication manager 820 may be incorporated into or shared with a receiver or a transmitter (e.g., the receiver 710 or the transmitter 730 described with reference to FIG. 7). In some examples, the wireless communication manager 820 may include a system information manager 845, an optional random access manager 850, a subsequent PDCCH information manager 835 or a transmission manager 840.

The transmission manager 840 may be used to transmit, on a beam, an indication of subsequent PDCCH indication enablement. The indication of subsequent PDCCH indication enablement may be transmitted in a MIB, a minimum SI transmission, a SIB, RRC signaling, or a combination thereof. The indication of subsequent PDCCH indication enablement may be formatted by the system information manager 845.

The transmission manager 840 may be used to include transmit, to at least one UE, a first transmission on the beam over a radio frequency spectrum during a first time interval, The first transmission may include an indication of a subsequent PDCCH transmission on the beam. The indication may be formatted by the subsequent PDCCH information manager 835. The indication of the subsequent PDCCH transmission may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. The transmission manager 840 may also be used to transmit the PDCCH on the beam during the second time interval.

In some examples, the random access manager 850 may be used to receive a random access preamble on the beam, and the transmission manager 840 may be used to transmit the first transmission and the PDCCH on the beam in a RAR window, based at least in part on the reception of the random access preamble.

Figure 9:
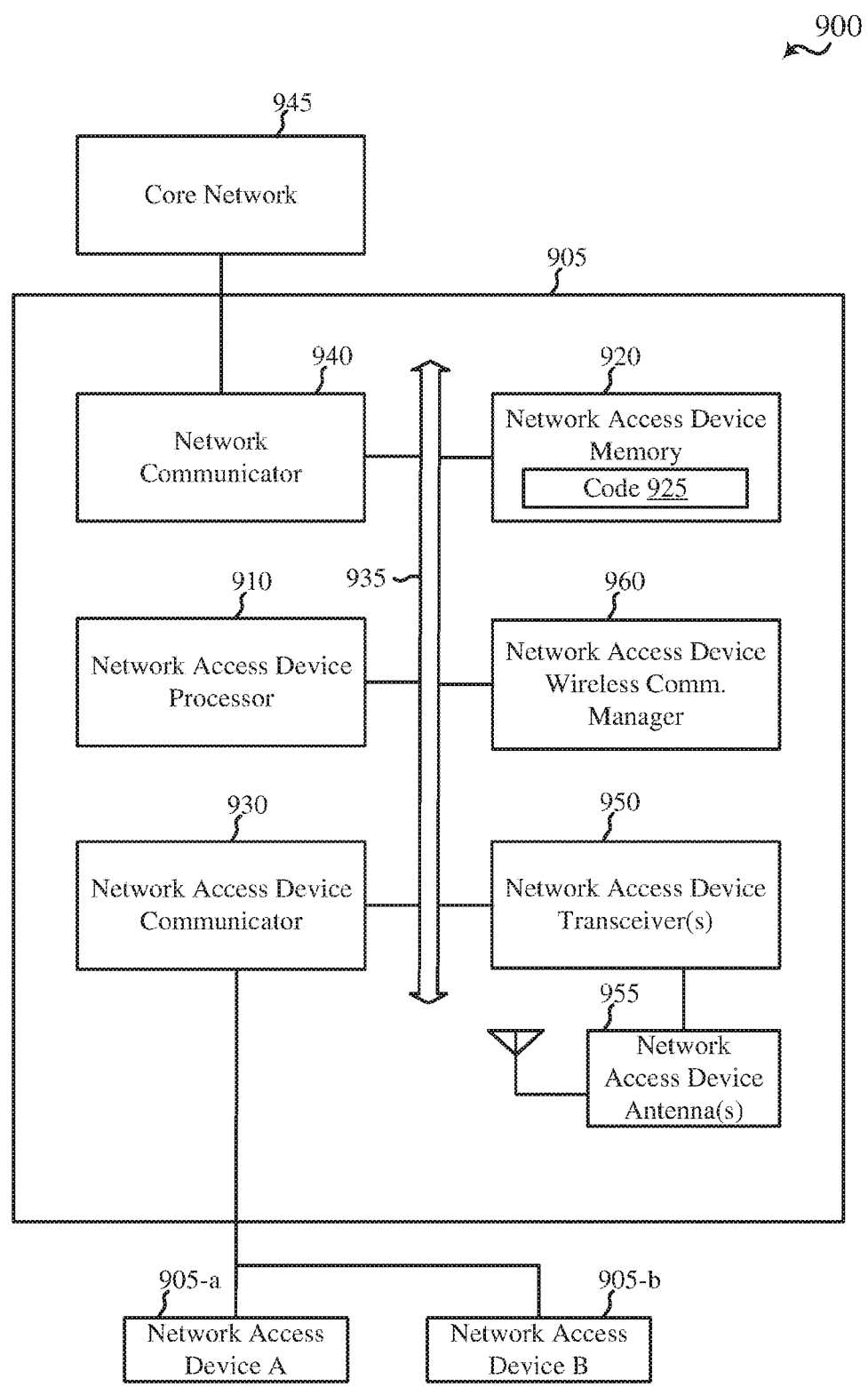
FIG. 9 shows a block diagram of a network access device for use in wireless communication, in accordance with various aspects of the present disclosure.

FIG. 9 shows a block diagram 900 of a network access device 905 for use in wireless communication, in accordance with various aspects of the present disclosure. In some examples, the network access device 905 may be an example of one or more aspects of the network access devices described with reference to FIG. 1 or 3, or aspects of the apparatus described with reference to FIG. 7. The network access device 905 may be configured to implement or facilitate at least some of the network access device, base station, or apparatus techniques and functions described with reference to FIG. 1, 2, 3, 7, or 8.

The network access device 905 may include a network access device processor 910, a network access device memory 920, at least one network access device transceiver (represented by network access device transceiver(s) 950), at least one network access device antenna (represented by network access device antenna(s) 955), or a network access device wireless communication manager 960. The network access device 905 may also include one or more of a network access device communicator 930 or a network communicator 940. Each of these components may be in communication with each other, directly or indirectly, over one or more buses 935.

The network access device memory 920 may include RAM or ROM. The network access device memory 920 may store computer-readable, computer-executable code 925 containing instructions that are configured to, when executed, cause the network access device processor 910 to perform various functions described herein related to wireless communication, including, for example, transmitting a transmission including an indication of a subsequent PDCCH transmission, transmitting the subsequent PDCCH transmission, etc. Alternatively, the computer-executable code 925 may not be directly executable by the network access device processor 910 but be configured to cause the network access device 905 (e.g., when compiled and executed) to perform various of the functions described herein.

The network access device processor 910 may include an intelligent hardware device, e.g., a CPU, a microcontroller, an ASIC, etc. The network access device processor 910 may process information received through the network access device transceiver(s) 950, the network access device communicator 930, or the network communicator 940. The network access device processor 910 may also process information to be sent to the transceiver(s) 950 for transmission through the antenna(s) 955, to the network access device communicator 930, for transmission to one or more other network access devices (e.g., network access device 905-*a* and/or network access device 905-*b*), or to the network communicator 940 for transmission to a core network 945, which may be an example of one or more aspects of the core network 130 described with reference to FIG. 1. The network access device processor 910 may handle, alone or in connection with the network access device wireless communication manager 960, various aspects of communicating over (or managing communications over) a radio frequency spectrum.

The network access device transceiver(s) 950 may include a modem configured to modulate packets and provide the modulated packets to the network access device antenna(s) 955 for transmission, and to demodulate packets received from the network access device antenna(s) 955. The network access device transceiver(s) 950 may, in some examples, be implemented as one or more network access device transmitters and one or more separate network access device receivers. The network access device transceiver(s) 950 may be configured to communicate bi-directionally, via the network access device antenna(s) 955, with one or more UEs or apparatuses, such as one or more of the UEs described with reference to FIG. 1 or 10, or the apparatus described with reference to FIG. 6. The network access device 905 may, for example, include multiple network access device antennas 955 (e.g., an antenna array). The network access device 905 may communicate with the core network 945 through the network communicator 940. The network access device 905 may also communicate with other network access devices, such as the network access device 905-*a* and/or the network access device 905-*b*, using the network access device communicator 930.

The network access device wireless communication manager 960 may be configured to perform or control some or all of the techniques or functions described with reference to FIG. 1, 2, 3, 7, or 8 related to wireless communication over a radio frequency spectrum. The network access device wireless communication manager 960, or portions of it, may include a processor, or some or all of the functions of the network access device wireless communication manager 960 may be performed by the network access device processor 910 or in connection with the network access device processor 910. In some examples, the network access device wireless communication manager 960 may be an example of the wireless communication manager described with reference to FIG. 1, 7, or 8.

Figure 10:
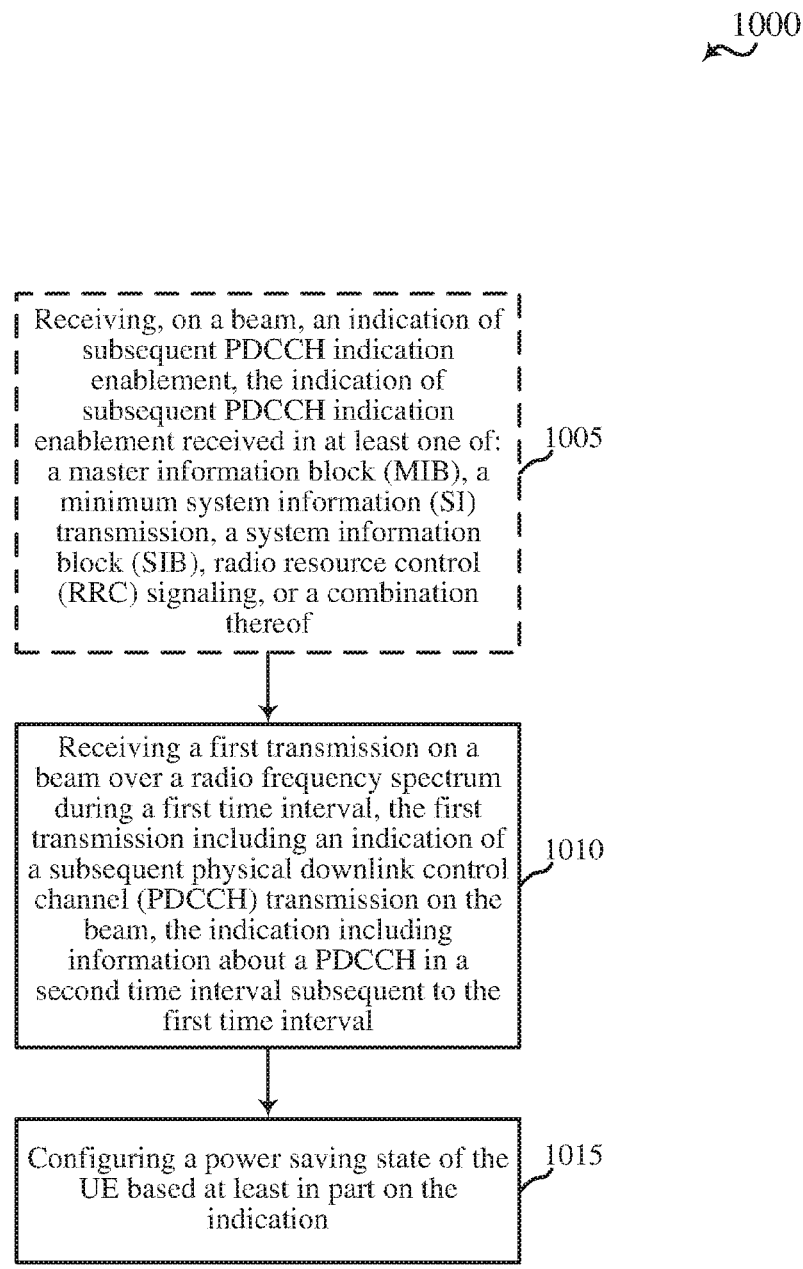
FIG. 10 is a flow chart illustrating an example of a method for wireless communication at a UE, in accordance with various aspects of the present disclosure.

FIG. 10 is a flow chart illustrating an example of a method 1000 for wireless communication at a UE, in accordance with various aspects of the present disclosure. For clarity, the method 1000 is described below with reference to aspects of one or more of the UEs described with reference to FIG. 1, 3, or 6, aspects of the apparatus described with reference to FIG. 4, or aspects of one or more of the wireless communication managers described with reference to FIG. 1, 4, 5, or 6. In some examples, a UE may execute one or more sets of codes to control the functional elements of the UE to perform the functions described below. Additionally or alternatively, the UE may perform one or more of the functions described below using special-purpose hardware.

At block 1005, the method 1000 may optionally include receiving, on a beam, an indication of subsequent PDCCH indication enablement. The indication of subsequent PDCCH indication enablement may be received in a MIB, a minimum SI transmission, a SIB, RRC signaling, or a combination thereof. In certain examples, the operation(s) at block 1005 may be performed using the transmission reception manager 435 or 535 described with reference to FIG. 4 or 5, or the system information processor 550 described with reference to FIG. 5.

At block 1010, the method 1000 may include receiving a first transmission on the beam over a radio frequency spectrum during a first time interval. The first transmission may include an indication of a subsequent PDCCH transmission on the beam. The indication may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In certain examples, the operation(s) at block 1010 may be performed using the transmission reception manager 435 or 535 or subsequent PDCCH information processor 440 or 540 described with reference to FIG. 4 or 5.

At block 1015, the method 1000 may include configuring a power saving state of the UE based at least in part on the indication. In certain examples, the operation(s) at block 1015 may be performed using the power saving configuration manager 445 or 545 described with reference to FIG. 4 or 5.

Figure 11:
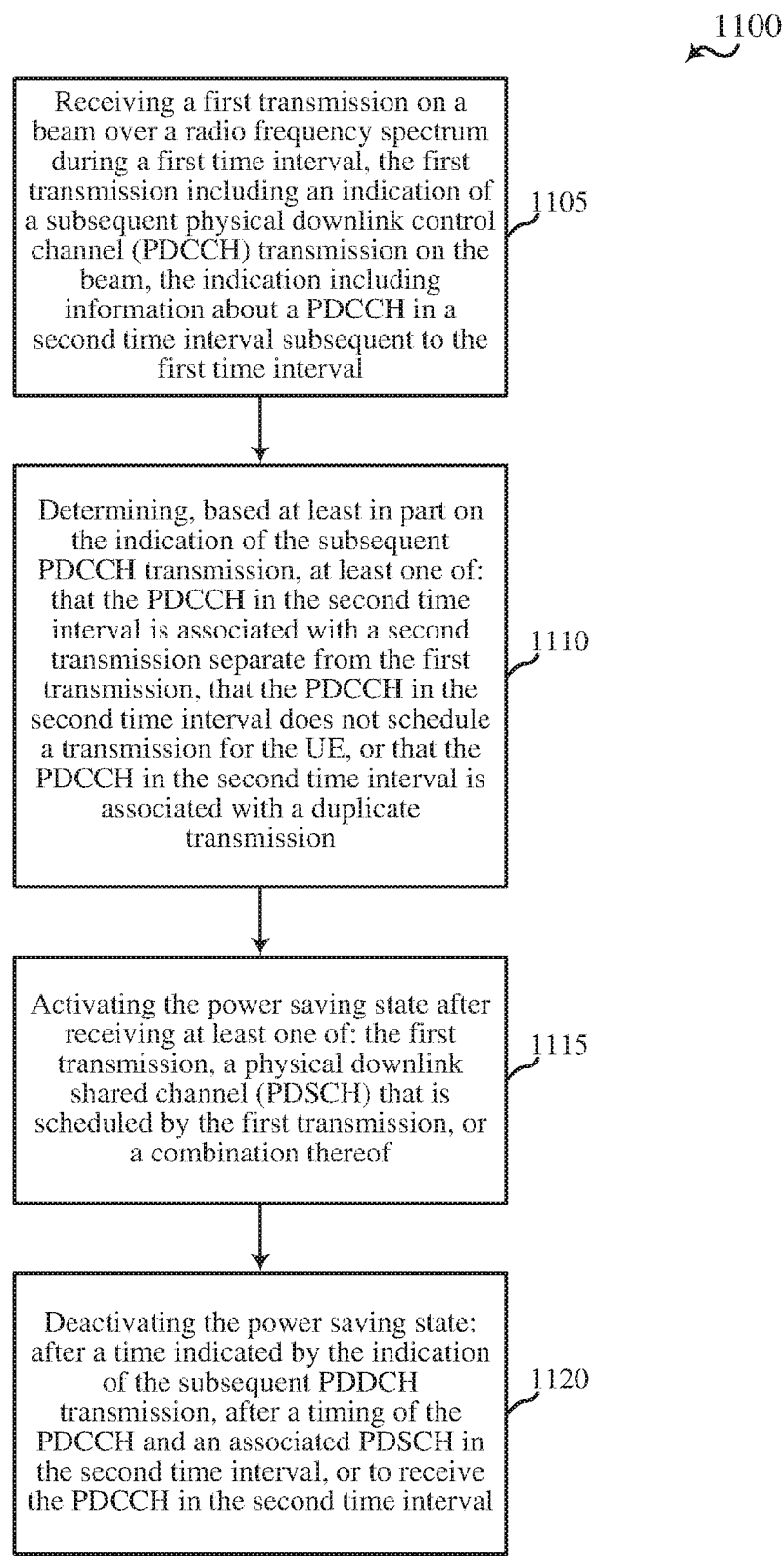
FIG. 11 is a flow chart illustrating an example of a method for wireless communication at a UE, in accordance with various aspects of the present disclosure.

FIG. 11 is a flow chart illustrating an example of a method 1100 for wireless communication at a UE, in accordance with various aspects of the present disclosure. For clarity, the method 1100 is described below with reference to aspects of one or more of the UEs described with reference to FIG. 1, 3, or 6, aspects of the apparatus described with reference to FIG. 4, or aspects of one or more of the wireless communication managers described with reference to FIG. 1, 4, 5, or 6. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include receiving a first transmission on a beam over a radio frequency spectrum during a first time interval. The first transmission may include an indication of a subsequent PDCCH transmission on the beam. The indication may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In certain examples, the operation(s) at block 1105 may be performed using the transmission reception manager 435 or 535 or subsequent PDCCH information processor 440 or 540 described with reference to FIG. 4 or 5.

At block 1110, the method 1100 may include determining, based at least in part on the indication of the subsequent PDCCH transmission, that the PDCCH in the second time interval is associated with a second transmission separate from the first transmission, or that the PDCCH in the second time interval does not schedule a transmission for the UE, or that the PDCCH in the second time interval is associated with a duplicate transmission. In certain examples, the operation(s) at block 1110 may be performed using the subsequent PDCCH information processor 440 or 540 described with reference to FIG. 4 or 5.

At blocks 1115 and 1120, the method 1100 may include configuring a power saving state of the UE based at least in part on the indication. At block 1115, the method 1100 may include activating the power saving state after receiving at least one of: the first transmission, a PDSCH that is scheduled by the first transmission, or a combination thereof. At block 1120, the method 1100 may include deactivating the power saving state after a time indicated by the indication of the subsequent PDCCH transmission, or after a timing of the PDCCH and an associated PDSCH in the second time interval, or to receive the PDCCH in the second time interval. In certain examples, the operation(s) at block 1115 or 1120 may be performed using the power saving configuration manager 445 or 545 described with reference to FIG. 4 or 5.

Figure 12:
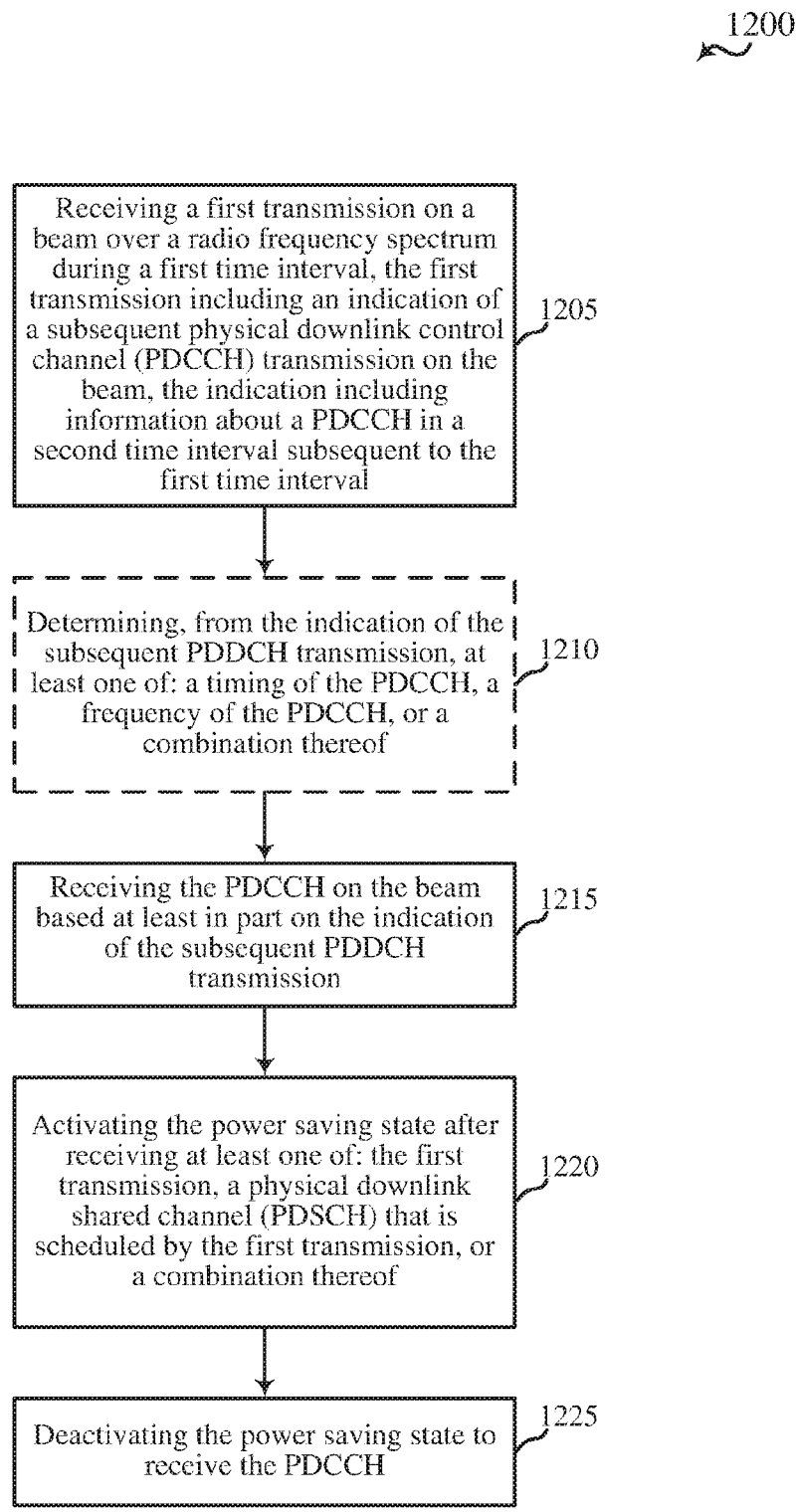
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs described with reference to FIG. 1, 3, or 6, aspects of the apparatus described with reference to FIG. 4, or aspects of one or more of the wireless communication managers described with reference to FIG. 1, 4, 5, or 6. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include receiving a first transmission on a beam over a radio frequency spectrum during a first time interval. The first transmission may include an indication of a subsequent PDCCH transmission on the beam. The indication may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In certain examples, the operation(s) at block 1205 may be performed using the transmission reception manager 435 or 535 or subsequent PDCCH information processor 440 or 540 described with reference to FIG. 4 or 5.

At block 1210, the method 1000 may optionally include determining, from the indication of the subsequent PDCCH transmission, a timing of the PDCCH, a frequency of the PDCCH, or a combination thereof. In certain examples, the operation(s) at block 1210 may be performed using the subsequent PDCCH information processor 440 or 540 described with reference to FIG. 4 or 5.

At block 1215, the method 1200 may include receiving the PDCCH on the beam based at least in part on the indication of the subsequent PDCCH transmission. In certain examples, the operation(s) at block 1215 may be performed using the transmission reception manager 435 or 535 described with reference to FIG. 4 or 5.

At blocks 1220 and 1225, the method 1200 may include configuring a power saving state of the UE based at least in part on the indication. At block 1220, the method 1200 may include activating the power saving state after receiving at least one of: the first transmission, a PDSCH that is scheduled by the first transmission, or a combination thereof. At block 1225, the method 1200 may include deactivating the power saving state to receive the PDCCH. In certain examples, the operation(s) at block 1220 or 1225 may be performed using the power saving configuration manager 445 or 545 described with reference to FIG. 4 or 5.

Figure 13:
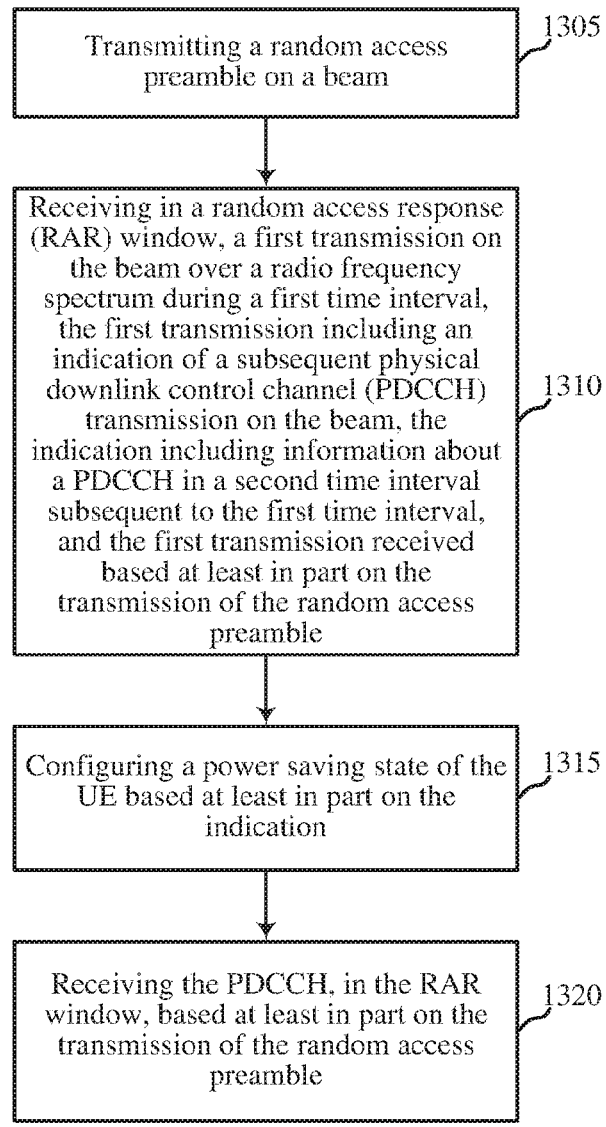
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs described with reference to FIG. 1, 3, or 6, aspects of the apparatus described with reference to FIG. 4, or aspects of one or more of the wireless communication managers described with reference to FIG. 1, 4, 5, or 6. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include transmitting a random access preamble on the beam. In certain examples, the operation(s) at block 1305 may be performed using the random access manager 555.

At block 1310, the method 1300 may include receiving, in a RAR window, a first transmission on a beam over a radio frequency spectrum during a first time interval. The first transmission may be received based at least in part on the transmission of the random access preamble. The first transmission may include an indication of a subsequent PDCCH transmission on the beam. The indication may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In certain examples, the operation(s) at block 1310 may be performed using the transmission reception manager 435 or 535 or subsequent PDCCH information processor 440 or 540 described with reference to FIG. 4 or 5, or the random access manager 555 described with reference to FIG. 5.

At block 1315, the method 1300 may include configuring a power saving state of the UE based at least in part on the indication. In certain examples, the operation(s) at block 1315 may be performed using the power saving configuration manager 445 or 545 described with reference to FIG. 4 or 5.

At block 1320, the method 1300 may include receiving the PDCCH, in the RAR window, based at least in part on the transmission of the random access preamble. In certain examples, the operation(s) at block 1320 may be performed using the transmission reception manager 435 or 535 described with reference to FIG. 4 or 5, or the random access manager 555 described with reference to FIG. 5.

The methods 1000, 1100, 1200, and 1300 described with reference to FIGS. 10, 11, 12, and 13 are examples of implementations of techniques described in the present disclosure. The operations of the method 1000, 1100, 1200, or 1300 may be rearranged, combined with other operations of the same or different methods, or otherwise modified, such that other implementations are possible. Operations may also be added to the method 1000, 1100, 1200, or 1300.

Figure 14:
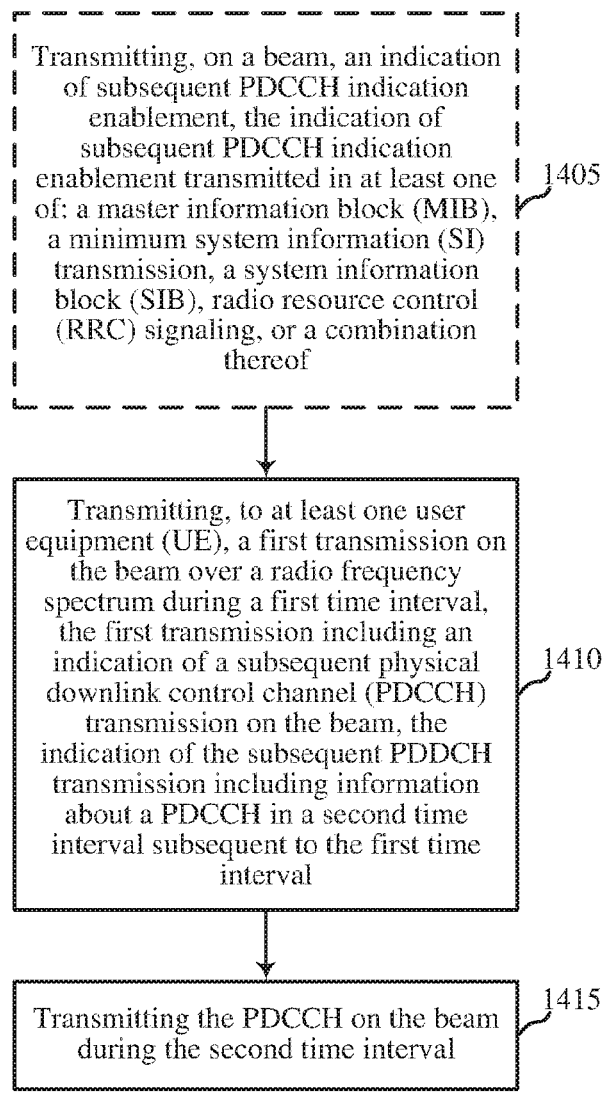
FIG. 14 is a flow chart illustrating an example of a method for wireless communication at a network access device, in accordance with various aspects of the present disclosure.

FIG. 14 is a flow chart illustrating an example of a method 1400 for wireless communication at a network access device, in accordance with various aspects of the present disclosure. For clarity, the method 1400 is described below with reference to aspects of one or more of the network access devices described with reference to FIG. 1, 3, or 9, aspects of the apparatus described with reference to FIG. 7, or aspects of one or more of the wireless communication managers described with reference to FIG. 1, 7, 8, or 9. In some examples, a network access device may execute one or more sets of codes to control the functional elements of the network access device to perform the functions described below. Additionally or alternatively, the network access device may perform one or more of the functions described below using special-purpose hardware.

At block 1405, the method 1400 may optionally include transmitting, on a beam, an indication of subsequent PDCCH indication enablement. The indication of subsequent PDCCH indication enablement may be transmitted in a MIB, a minimum SI transmission, a SIB, RRC signaling, or a combination thereof. In certain examples, the operation(s) at block 1405 may be performed using the transmission manager 740 or 840 described with reference to FIG. 7 or 8, or the system information manager 845 described with reference to FIG. 8.

At block 1410, the method 1400 may include transmitting, to at least one UE, a first transmission on the beam over a radio frequency spectrum during a first time interval, The first transmission may include an indication of a subsequent PDCCH transmission on the beam. The indication of the subsequent PDCCH transmission may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In certain examples, the operation(s) at block 1410 may be performed using the subsequent PDCCH information manager 735 or 835 or transmission manager 740 or 840 described with reference to FIG. 7 or 8.

At block 1415, the method 1400 may include transmitting the PDCCH on the beam during the second time interval. In certain examples, the operation(s) at block 1415 may be performed using the transmission manager 740 or 840 described with reference to FIG. 7 or 8.

Figure 15:
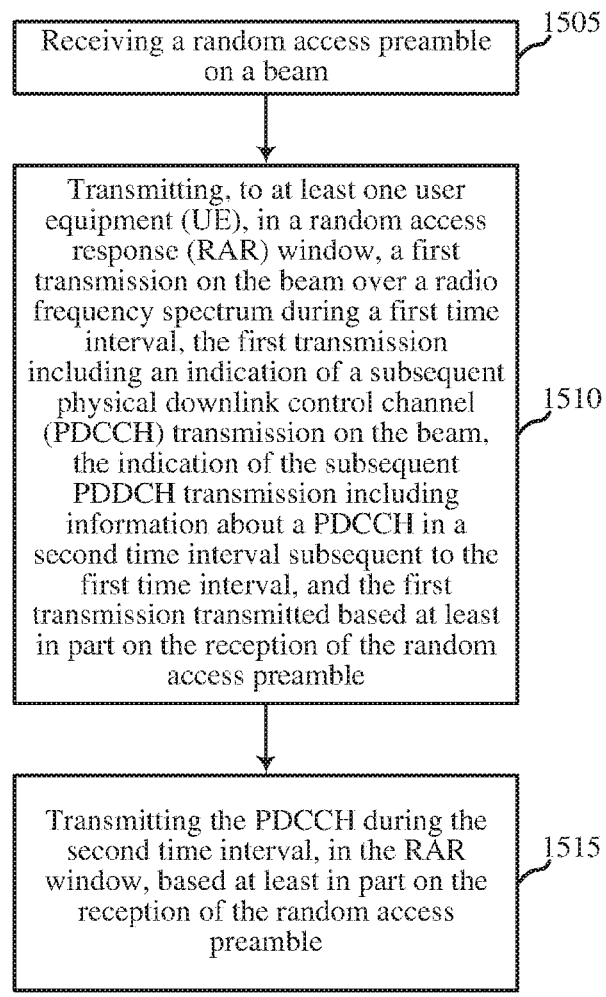
FIG. 15 is a flow chart illustrating an example of a method for wireless communication at a network access device, in accordance with various aspects of the present disclosure.

FIG. 15 is a flow chart illustrating an example of a method 1500 for wireless communication at a network access device, in accordance with various aspects of the present disclosure. For clarity, the method 1500 is described below with reference to aspects of one or more of the network access devices described with reference to FIG. 1, 3, or 9, aspects of the apparatus described with reference to FIG. 7, or aspects of one or more of the wireless communication managers described with reference to FIG. 1, 7, 8, or 9. In some examples, a network access device may execute one or more sets of codes to control the functional elements of the network access device to perform the functions described below. Additionally or alternatively, the network access device may perform one or more of the functions described below using special-purpose hardware.

At block 1505, the method 1500 may include receiving a random access preamble on the beam. In certain examples, the operation(s) at block 1505 may be performed using the random access manager 850 described with reference to FIG. 8.

At block 1510, the method 1500 may include transmitting, to at least one UE, in a RAR window, a first transmission on a beam over a radio frequency spectrum during a first time interval, The first transmission may be transmitted based at least in part on the reception of the random access preamble. The first transmission may include an indication of a subsequent PDCCH transmission on the beam. The indication of the subsequent PDCCH transmission may include information about a PDCCH in a second time interval subsequent to the first time interval. In some examples, the first transmission may include another PDCCH, a PDSCH, or a combination thereof. In some examples, the indication of the subsequent PDCCH transmission may include a first indication of a timing of the PDCCH, a second indication of a frequency of the PDCCH, a third indication of whether the PDCCH is associated with a new transmission or a duplicate transmission, a fourth indication of a type of data associated with the PDCCH, a fifth indication of an intended recipient of the PDCCH or an associated PDSCH, or a combination thereof. In certain examples, the operation(s) at block 1510 may be performed using the subsequent PDCCH information manager 735 or 835 or transmission manager 740 or 840 described with reference to FIG. 7 or 8, or the random access manager 850 described with reference to FIG. 8.

At block 1515, the method 1500 may include transmitting the PDCCH on the beam during the second time interval, in the RAR window, based at least in part on the reception of the random access preamble. In certain examples, the operation(s) at block 1515 may be performed using the transmission manager 740 or 840 described with reference to FIG. 7 or 8, or the random access manager 850 described with reference to FIG. 8.

The methods 1400 and 1500 described with reference to FIGS. 14 and 15 are examples of implementations of techniques described in the present disclosure. The operations of the method 1400 or 1500 may be rearranged, combined with other operations of the same or different methods, or otherwise modified, such that other implementations are possible. Operations may also be added to the method 1400 or 1500.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, IX, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP, CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving, by the UE, a first transmission on a beam over a radio frequency spectrum during a first time interval, wherein the first transmission comprises an indication of a subsequent physical downlink control channel (PDCCH) transmission on the beam, the indication comprising information about the PDCCH in a second time interval subsequent to the first time interval, the information indicating for the UE to remain in a power saving state during the second time interval;
   activating the power saving state of the UE after receiving a physical downlink shared channel (PDSCH) that is scheduled by the first transmission and based at least in part on the indication; and
   deactivating the power saving state during the second time interval to receive the PDCCH on the beam, the PDCCH comprising second information about a second PDCCH in a third time interval subsequent to the second time interval.

2. The method of claim 1, further comprising:
   determining, based at least in part on the indication of the subsequent PDCCH transmission, at least one of: that the PDCCH in the second time interval is associated with a second transmission separate from the first transmission, that the PDCCH in the second time interval does not schedule a transmission for the UE, or that the PDCCH in the second time interval is associated with a duplicate transmission.

3. The method of claim 2, further comprising:
   activating the power saving state after receiving the first transmission; and
   deactivating the power saving state: after a time indicated by the indication of the subsequent PDCCH transmission or after a timing of the PDCCH and an associated PDSCH in the second time interval.

4. The method of claim 1, further comprising:
   receiving the PDCCH on the beam based at least in part on the indication of the subsequent PDCCH transmission.

5. The method of claim 4, further comprising:
   determining, from the indication of the subsequent PDCCH transmission, at least one of: a timing of the PDCCH, a frequency of the PDCCH, or a combination thereof.

6. The method of claim 4, further comprising:
   activating the power saving state after receiving the first transmission.

7. The method of claim 1, further comprising:
   receiving, on the beam, a second indication that transmission of the indication of the subsequent PDCCH transmission is enabled, the second indication received in at least one of: a master information block (MIB), a minimum system information (SI) transmission, a system information block (SIB), radio resource control (RRC) signaling, or a combination thereof.

8. The method of claim 1, wherein the first transmission comprises another PDCCH, another PDSCH, or a combination thereof.

9. The method of claim 1, wherein the indication of the subsequent PDCCH transmission comprises at least one of: a first indication of a timing of the PDCCH, a second indication of a frequency of the PDCCH, a third indication that the PDCCH is associated with a duplicate transmission, a fourth indication of a type of data associated with the PDCCH, or a combination thereof.

10. The method of claim 1, further comprising:
    transmitting a random access preamble on the beam, wherein the first transmission and the PDCCH are received on the beam in a random access response (RAR) window, based at least in part on the transmission of the random access preamble.

11. An apparatus for wireless communication at a user equipment (UE), comprising:
    a processor;
    memory coupled with the processor; and
    instructions stored in the memory and operable, when executed by the processor, to cause the apparatus to:
    receive, by the UE, a first transmission on a beam over a radio frequency spectrum during a first time interval, wherein the first transmission comprises an indication of a subsequent physical downlink control channel (PDCCH) transmission on the beam, the indication comprising information about the PDCCH in a second time interval subsequent to the first time interval, the information indicating for the UE to remain in a power saving state during the second time interval;
    activate the power saving state of the UE after receiving a physical downlink shared channel (PDSCH) that is scheduled by the first transmission and based at least in part on the indication; and deactivate the power saving state during the second time interval to receive the PDCCH on the beam, the PDCCH comprising second information about a second PDCCH in a third time interval subsequent to the second time interval.

12. The apparatus of claim 11, wherein the instructions are executable by the processor to cause the apparatus to:
determine, based at least in part on the indication of the subsequent PDCCH transmission, at least one of: that the PDCCH in the second time interval is associated with a second transmission separate from the first transmission, that the PDCCH in the second time interval does not schedule a transmission for the UE, or that the PDCCH in the second time interval is associated with a duplicate transmission.

13. The apparatus of claim 12, wherein the instructions are executable by the processor to cause the apparatus to:
activate the power saving state after receiving the first transmission; and
deactivate the power saving state: after a time indicated by the indication of the subsequent PDCCH transmission or after a timing of the PDCCH and an associated PDSCH in the second time interval.

14. The apparatus of claim 11, wherein the instructions are executable by the processor to cause the apparatus to:
receive the PDCCH on the beam based at least in part on the indication of the subsequent PDCCH transmission.

15. The apparatus of claim 14, wherein the instructions are executable by the processor to cause the apparatus to:
determine, from the indication of the subsequent PDCCH transmission, at least one of: a timing of the PDCCH, a frequency of the PDCCH, or a combination thereof.

16. The apparatus of claim 14, wherein the instructions are executable by the processor to cause the apparatus to:
activate the power saving state after receiving the first transmission.

17. The apparatus of claim 11, wherein the instructions are executable by the processor to cause the apparatus to:
receive, on the beam, a second indication that transmission of the indication of the subsequent PDCCH transmission is enabled, the second indication received in at least one of: a master information block (MIB), a minimum system information (SI) transmission, a system information block (SIB), radio resource control (RRC) signaling, or a combination thereof.

18. The apparatus of claim 11, wherein the first transmission comprises another PDCCH, another PDSCH, or a combination thereof.

19. The apparatus of claim 11, wherein the indication of the subsequent PDCCH transmission comprises at least one of: a first indication of a timing of the PDCCH, a second indication of a frequency of the PDCCH, a third indication that the PDCCH is associated with a duplicate transmission, a fourth indication of a type of data associated with the PDCCH, or a combination thereof.

20. The apparatus of claim 11, wherein the instructions are executable by the processor to cause the apparatus to:
transmit a random access preamble on the beam,
wherein the first transmission and the PDCCH are received on the beam in a random access response (RAR) window, based at least in part on the transmission of the random access preamble.

21. A method for wireless communication at a network access device, comprising:
transmitting, to at least one user equipment (UE), a first transmission on a beam over a radio frequency spectrum during a first time interval, wherein the first transmission comprises an indication of a subsequent physical downlink control channel (PDCCH) transmission on the beam, the indication of the subsequent PDCCH transmission comprising information about the PDCCH in a second time interval subsequent to the first time interval, the information indicating for the UE to remain in a power saving state during the second time interval;
transmitting a physical downlink shared channel (PDSCH) scheduled by the first transmission, wherein the power saving state of the at least one UE is activated after transmitting the PDSCH; and
transmitting the PDCCH on the beam during the second time interval, the PDCCH comprising second information about a second PDCCH in a third time interval subsequent to the second time interval.

22. The method of claim 21, further comprising:
transmitting a second indication that transmission of the indication of the subsequent PDCCH transmission is enabled, the second indication transmitted in at least one of: a master information block (MIB), a minimum system information (SI) transmission, a system information block (SIB), radio resource control (RRC) signaling, or a combination thereof.

23. The method of claim 21, wherein the first transmission comprises another PDCCH, another PDSCH, or a combination thereof.

24. The method of claim 21, wherein the indication of the subsequent PDCCH transmission comprises at least one of: a first indication of a timing of the PDCCH, a second indication of a frequency of the PDCCH, a third indication that the PDCCH is associated with a duplicate transmission, a fourth indication of a type of data associated with the PDCCH, a fifth indication of an intended recipient of the PDCCH or an associated physical downlink shared channel (PDSCH), or a combination thereof.

25. The method of claim 21, further comprising:
receiving a random access preamble on the beam,
wherein the first transmission and the PDCCH are transmitted on the beam in a random access response (RAR) window, based at least in part on the reception of the random access preamble.

26. An apparatus for wireless communication at a network access device, comprising:
a processor;
memory coupled with the processor; and
instructions stored in the memory and operable, when executed by the processor, to cause the apparatus to:
transmit, to at least one user equipment (UE), a first transmission on a beam over a radio frequency spectrum during a first time interval, wherein the first transmission comprises an indication of a subsequent physical downlink control channel (PDCCH) transmission on the beam, the indication of the subsequent PDCCH transmission comprising information about the PDCCH in a second time interval subsequent to the first time interval, the information indicating for the UE to remain in a power saving state during the second time interval;
transmit a physical downlink shared channel (PDSCH) scheduled by the first transmission, wherein the power saving state of the at least one UE is activated after transmitting the PDSCH; and
transmit the PDCCH on the beam during the second time interval, the PDCCH comprising second information about a second PDCCH in a third time interval subsequent to the second time interval.

27. The apparatus of claim 26, wherein the first transmission comprises another PDCCH, another PDSCH, or a combination thereof.

28. The apparatus of claim 26, wherein the indication of the subsequent PDCCH transmission comprises at least one of: a first indication of a timing of the PDCCH, a second indication of a frequency of the PDCCH, a third indication that the PDCCH is associated with a duplicate transmission, a fourth indication of a type of data associated with the PDCCH, a fifth indication of an intended recipient of the PDCCH or an associated physical downlink shared channel (PDSCH), or a combination thereof.

29. The apparatus of claim 26, wherein the instructions are executable by the processor to cause the apparatus to:
   receiving a random access preamble on the beam,
   wherein the first transmission and the PDCCH are transmitted on the beam in a random access response (RAR) window, based at least in part on the reception of the random access preamble.

\* \* \* \* \*